US012684282B2

(12) United States Patent
Pike

(10) Patent No.: US 12,684,282 B2
(45) Date of Patent: Jul. 14, 2026

(54) SPATIAL IMAGING ON AUDIO PLAYBACK DEVICES

(71) Applicant: Sonos, Inc., Goleta, CA (US)

(72) Inventor: Christopher Pike, Manchester (GB)

(73) Assignee: Sonos, Inc., Goleta, CA (US)

( * ) Notice: Subject to any disclaimer, the term of this patent is extended or adjusted under 35 U.S.C. 154(b) by 0 days.

(21) Appl. No.: 19/109,896

(22) PCT Filed: Sep. 6, 2023

(86) PCT No.: PCT/US2023/073537
§ 371 (c)(1),
(2) Date: Mar. 7, 2025

(87) PCT Pub. No.: WO2024/054834
PCT Pub. Date: Mar. 14, 2024

(65) Prior Publication Data
US 2026/0006375 A1 Jan. 1, 2026

Related U.S. Application Data

(60) Provisional application No. 63/374,855, filed on Sep. 7, 2022.

(51) Int. Cl.
| | |
|---|---|
| *H04R 25/00* | (2006.01) |
| *G06F 3/16* | (2006.01) |
| *H04R 1/02* | (2006.01) |
| *H04R 1/26* | (2006.01) |
| *H04S 7/00* | (2006.01) |

(52) U.S. Cl.
CPC .............. *H04R 1/26* (2013.01); *G06F 3/165* (2013.01); *H04R 1/02* (2013.01); *H04S 7/30* (2013.01)

(58) Field of Classification Search
CPC .. G06F 3/165; H04R 1/02; H04R 1/26; H04S 7/30
USPC ......................................................... 381/182
See application file for complete search history.

(56) References Cited

U.S. PATENT DOCUMENTS

| | | | |
|---|---|---|---|
| 5,440,644 A | 8/1995 | Farinelli et al. | |
| 5,761,320 A | 6/1998 | Farinelli et al. | |
| 5,923,902 A | 7/1999 | Inagaki | |

(Continued)

FOREIGN PATENT DOCUMENTS

| | | |
|---|---|---|
| EP | 1389853 A1 | 2/2004 |
| WO | 0153994 A2 | 7/2001 |

(Continued)

OTHER PUBLICATIONS

AudioTron Quick Start Guide, Version 1.0, Mar. 2001, 24 pages.

(Continued)

*Primary Examiner* — Phylesha Dabney
(74) *Attorney, Agent, or Firm* — Fortem IP LLP

(57) ABSTRACT

Example techniques relate to stereo imaging with audio playback devices. Example playback devices described herein may include multiple speakers, such as a forward-firing audio transducer and side-firing audio transducers. Using example techniques, such playback devices may play stereo content partially directly and partially as a dipole, which may enhance (e.g., widen) a stereo image formed by the transducers. Yet further, such techniques may be combined with steering techniques to direct output of the transducers away from obstructions that may be present in proximity to the audio playback devices.

20 Claims, 18 Drawing Sheets

(56) References Cited

U.S. PATENT DOCUMENTS

| | | | |
|---|---|---|---|
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollström et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty |
| 2004/0024478 | A1 | 2/2004 | Hans et al. |
| 2006/0106620 | A1 | 5/2006 | Thompson et al. |
| 2006/0153391 | A1 | 7/2006 | Hooley et al. |
| 2007/0142944 | A1 | 6/2007 | Goldberg et al. |
| 2009/0245535 | A1 | 10/2009 | Van Dijk |
| 2011/0216926 | A1 | 9/2011 | Riggs et al. |
| 2015/0104037 | A1 | 4/2015 | Lee et al. |
| 2017/0164097 | A1 | 6/2017 | Fincham |
| 2018/0035202 | A1 | 2/2018 | Borss et al. |
| 2020/0213735 | A1 | 7/2020 | Family et al. |

FOREIGN PATENT DOCUMENTS

| | | | |
|---|---|---|---|
| WO | 03093950 | A2 | 11/2003 |
| WO | 2011161567 | A1 | 12/2011 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Extended Search Report mailed on Oct. 21, 2025, issued in connection with European Application No. 23863950.4, 6 pages.
Faller, Christof, "Compact Stereo Loudspeakers with Dipole Processing," Audio Engineering Society Convention Paper 10154 (Presented at the 146th Convention), Mar. 20-23, 2019, 8 pages.
International Bureau, International Preliminary Report on Patentability, mailed on Mar. 20, 2025, issued in connection with International Application No. PCT/US2023/073537, filed on Sep. 6, 2023, 14 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
Sonos, Inc. v. D&M Holdings (No. 14-1330-RGA), DI 219, Claim Construction Opinion (Jan. 12, 2017) (24 pages).
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
International Search Report and Written Opinion mailed February Feb. 22, 2024; International Application No. PCT/US2023/073537; Applicant: Sonos, Inc.; 27 pages.
Ahrens et al., "The soundscape renderer: A unified spatial audio reproduction framework for arbitrary rendering methods", Audio Engineering Society Convention 124. Audio Engineering Society, 2008. Retrieved on Dec. 25, 2023 (Dec. 25, 2023) from <https://www.aes.org/e-lib/browse.cfm?elib=14460> entire document.

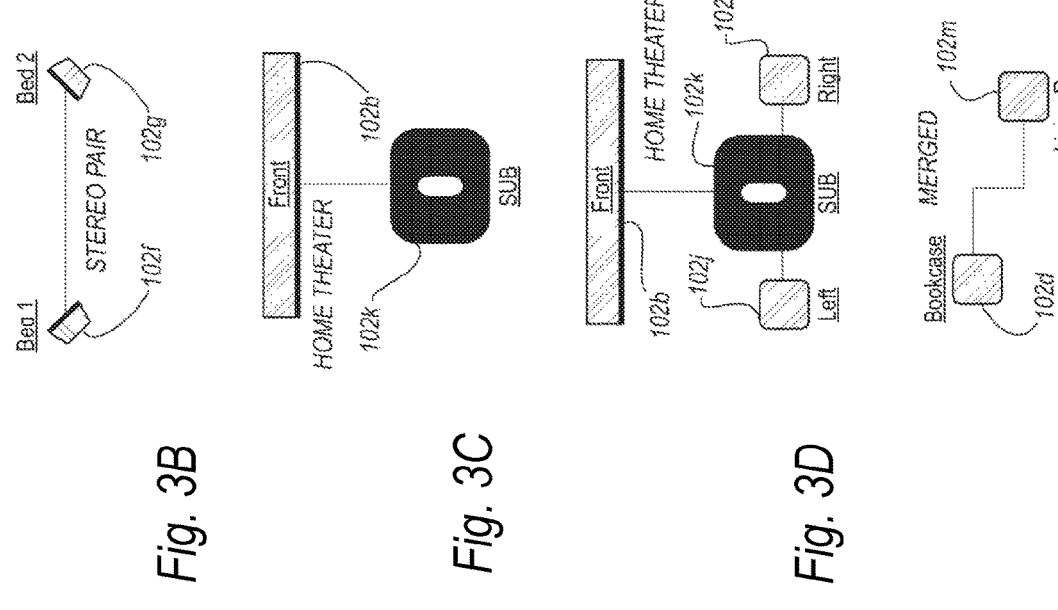
*Fig. 3B*
*Fig. 3C*
*Fig. 3D*
*Fig. 3E*
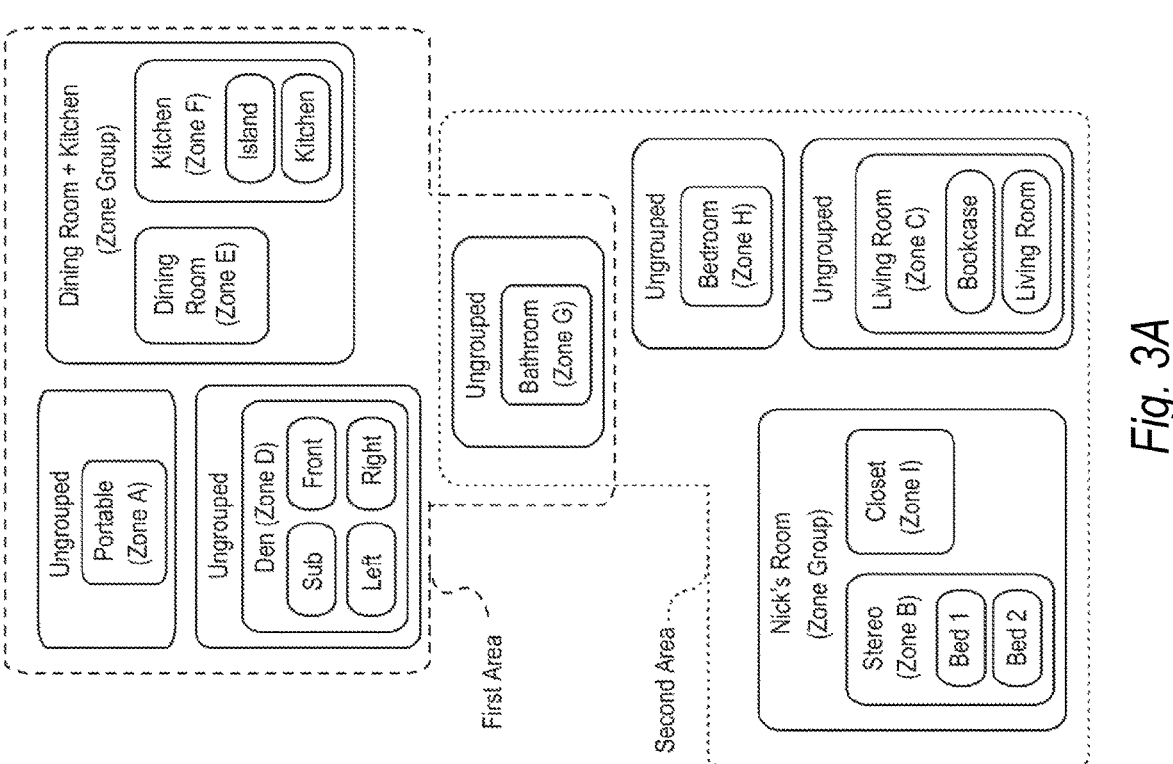
*Fig. 3A*

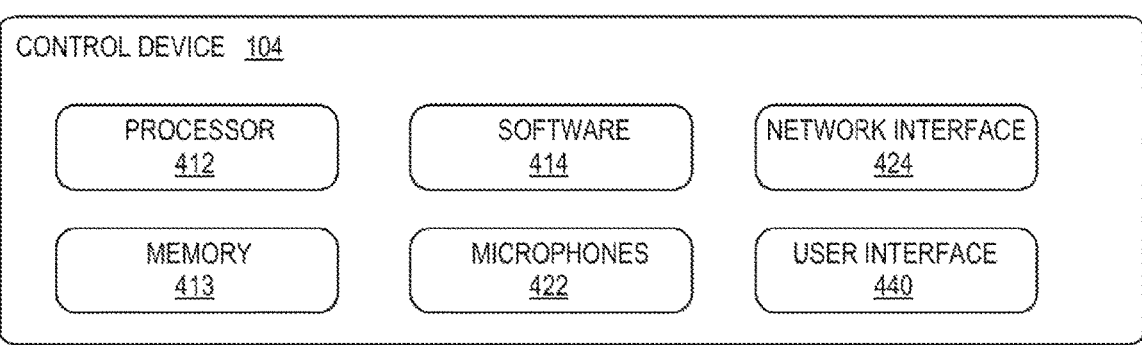

CONTROL DEVICE   104

PROCESSOR
412

SOFTWARE
414

NETWORK INTERFACE
424

MEMORY
413

MICROPHONES
422

USER INTERFACE
440

NOW PLAYING  (Office)

Track Title
Artist Name

} 544

QUEUE

Track 1
Track 2
Track 3
Track 4

} 546

Music Source 1     First VAS
Music Source 2     Second VAS
Music Source 3
+ ADD Music source    + ADD VAS source

} 548

} 542

☆ Sonos    ♫ Browse    🏠 Rooms    🔍 Search music

No Music
Balcony                    Group

Audio Component
*Living Room*
Living Room                Group

No Music
Dining Room
+ Kitchen                  Group

No Music
Office                     Group

543

☆ Sonos    ♫ Browse    🏠 Rooms    🔍 Search music

Directivity Patterns of Dipole With Equalization

Directivity Pattern of Dipole With Combined Direct and Dipole Reproduction

Direct and Dipole Combinations

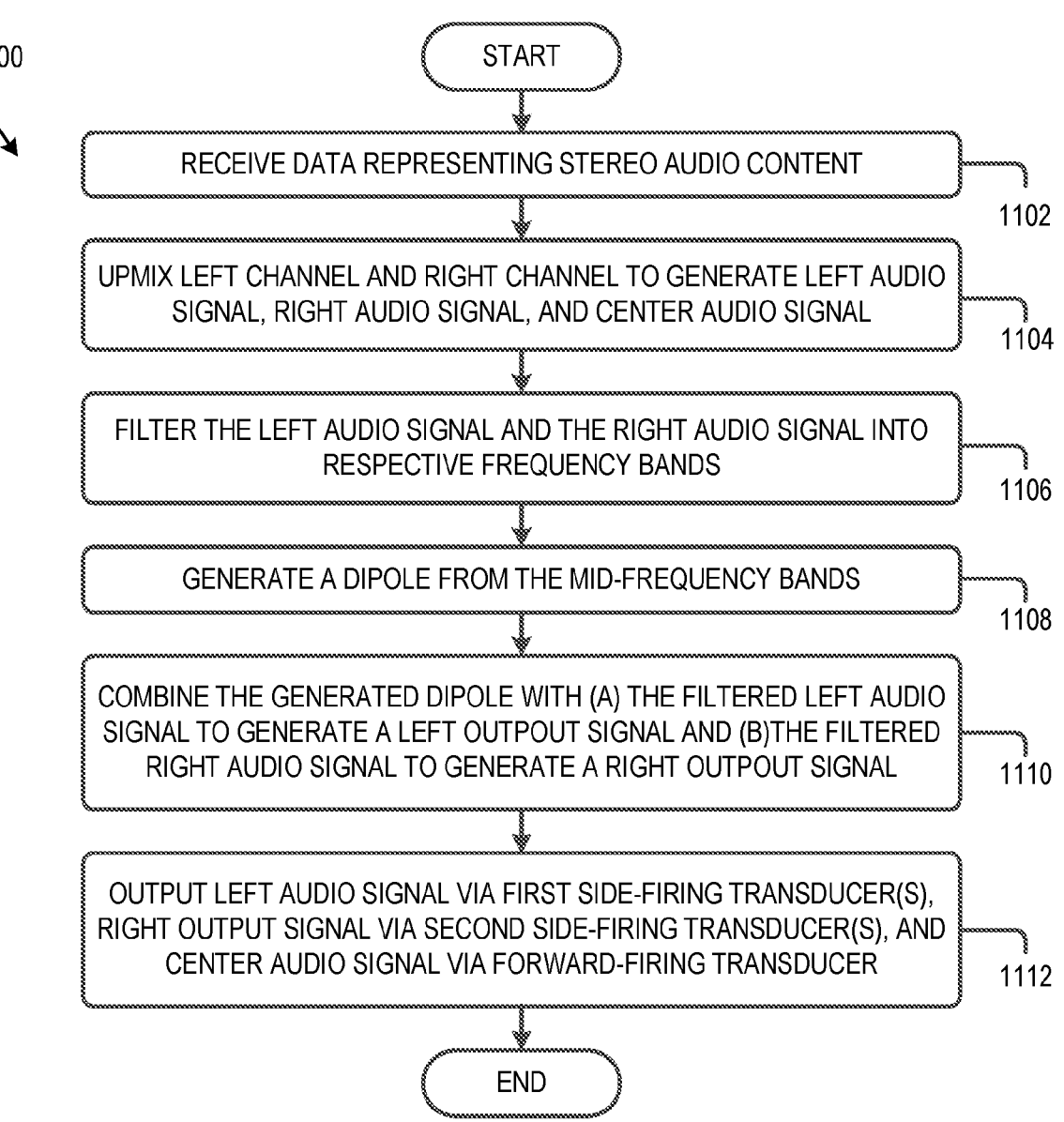

1100

START

RECEIVE DATA REPRESENTING STEREO AUDIO CONTENT
1102

UPMIX LEFT CHANNEL AND RIGHT CHANNEL TO GENERATE LEFT AUDIO SIGNAL, RIGHT AUDIO SIGNAL, AND CENTER AUDIO SIGNAL
1104

FILTER THE LEFT AUDIO SIGNAL AND THE RIGHT AUDIO SIGNAL INTO RESPECTIVE FREQUENCY BANDS
1106

GENERATE A DIPOLE FROM THE MID-FREQUENCY BANDS
1108

COMBINE THE GENERATED DIPOLE WITH (A) THE FILTERED LEFT AUDIO SIGNAL TO GENERATE A LEFT OUTPOUT SIGNAL AND (B)THE FILTERED RIGHT AUDIO SIGNAL TO GENERATE A RIGHT OUTPOUT SIGNAL
1110

OUTPUT LEFT AUDIO SIGNAL VIA FIRST SIDE-FIRING TRANSDUCER(S), RIGHT OUTPUT SIGNAL VIA SECOND SIDE-FIRING TRANSDUCER(S), AND CENTER AUDIO SIGNAL VIA FORWARD-FIRING TRANSDUCER
1112

END

*Fig. 11*

SPATIAL IMAGING ON AUDIO PLAYBACK DEVICES

CROSS-REFERENCE TO RELATED APPLICATION

This application is a 371 national phase application of International Patent Application No. PCT/US2023/073537, filed Sep. 6, 2023, which claims the benefit of priority to U.S. Patent Application No. 63/374,855, filed Sep. 7, 2022, each of which is incorporated herein by reference in its entirety.

FIELD OF THE DISCLOSURE

The present technology relates to consumer goods and, more particularly, to methods, systems, products, features, services, and other elements directed to voice-assisted control of media playback systems or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings where:

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIGS. 3A, 3B, 3C, 3D and 3E are diagrams showing example playback device configurations in accordance with aspects of the disclosure.

FIG. 4 is a functional block diagram of an example controller device in accordance with aspects of the disclosure.

FIGS. 5A and 5B are controller interfaces in accordance with aspects of the disclosure.

FIG. 11 is a flow diagram of an example method in accordance with aspects of the disclosed technology.

Figure 1A:
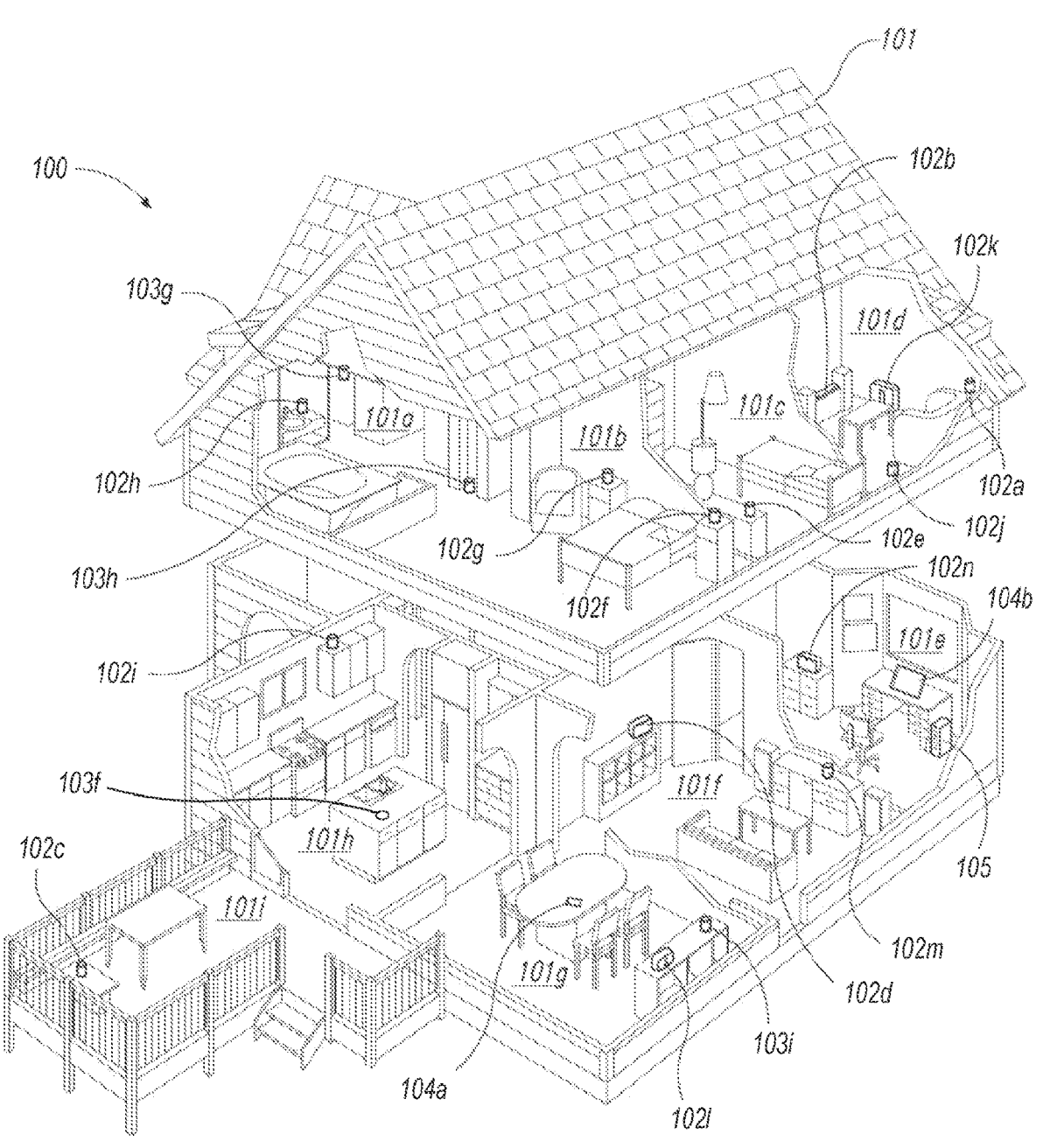
FIG. 1A is a partial cutaway view of an environment having a media playback system configured in accordance with aspects of the disclosed technology.

The drawings are for purposes of illustrating example embodiments, but it should be understood that the inventions are not limited to the arrangements and instrumentality shown in the drawings. In the drawings, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles, and other features shown in the Figures are merely illustrative of particular embodiments of the disclosed technology. Accordingly, other embodiments can have other details, dimensions, angles, and features without departing from the spirit or scope of the disclosure. In addition, those of ordinary skill in the art will appreciate that further embodiments of the various disclosed technologies can be practiced without several of the details described below.

DETAILED DESCRIPTION

I. Overview

Examples described herein relate to spatial imaging techniques on audio playback devices that include side-firing audio transducers and at least one forward-firing audio transducer. Some loudspeakers include side-firing left and right audio transducers, which have an image widening effect caused by the transducer's directivity. One limitation with such loudspeakers is that the effect is only achieved at higher frequencies (e.g., above a few kHz). This limitation is more pronounced with compact speakers, as any frequencies where the wavelength is larger than the loudspeaker are reproduced approximately omni-directionally. On the other hand, reproduction of stereo signals as a dipole provides good first-order directionality at low and mid-frequencies, but poor directionality at high frequencies. By combining these characteristics via reproduction of a stereo signal partially directly and partially as a dipole, example spatial imaging techniques may produce a wider stereo image relative to certain other techniques.

In example techniques, partial-direct and partial-dipole reproduction of the stereo signal is based on three signals generated from the stereo signal. The left and right channels of a stereo signal are up-mixed to generate a left audio signal, a right audio signal, and a center audio signal. Within examples, the up-mixer is configured to generate a center audio signal that is not strongly correlated with the left audio signal and a right audio signal, as less correlation between such signals may improve the spatial width. Yet further, the up-mixer may be configured to reduce correlation between the left and right signals (as compared with the input left and right channels of the stereo signal), which may improve the effectiveness of dipole processing.

Given the left audio signal, a right audio signal, and a center audio signal, example techniques may further include dipole processing of the mid-frequency band of the left audio signal and the right audio signal. In particular, the playback device filters a mid-frequency band of the left audio signal and the right audio signal from the left audio signal and the right audio signal. The mid-frequency bands of the left audio signal and the right audio signal are then used to generate a dipole. Then, the side-firing transducers may output the ambient component while the forward-firing transducers output the primary component, which yields a playback device with both ambient and direct surround behavior. Example dipole processing techniques are described by Faller. Faller, C. (2019). "Compact Stereo Loudspeakers with Dipole Processing." Audio Engineering Society, Convention Paper 10154, http://www.aes.org/e-lib/browse.cfm?elib=20287.

In example implementations, the upper and lower bounds of the mid-frequency band may be limited by certain considerations. Although, as noted above, a dipole has good directionality at low frequencies, in certain practical applications, too much gain may be required at low frequencies to achieve dipole operation. As such, the lower bound of the mid-frequency band may be limited to a frequency that balances the benefit of dipole operation and the gain required (e.g., ~300 Hz). Frequencies below this lower bound are excluded from the dipole processing and are reproduced directly.

The upper bound of the dipole is limited by the first null of its response, which may occur at different frequencies based on design characteristics (e.g., the distance between the side-firing transducers). In certain example playback devices described herein, the first null may occur around 1200 Hz. Frequencies above this upper bound are excluded from the dipole processing and instead are output directly. However, as noted above, output from side-firing audio transducers natively has good directivity at higher frequencies (above ~1-2 kHz).

After generating the dipole, the dipole is combined with the filtered left audio signal to generate a left output signal and the filtered right audio signal to generate a right output signal. The left output signal includes both dipole and direct output in the mid-frequency band and the direct signal of the left audio channel in the bass and treble portions. Similarly, the right output signal includes both dipole and direct output in the mid-frequency band and the original signal of the right audio channel in the bass and treble portions.

The left output signal, the right output signal, and the center audio signal are then output by respective audio transducers of the playback device, which results in reproduction of the stereo signal partially directly and partially as a dipole. In particular, bass and treble frequencies of the left output signal are output directly via one or more first side-firing transducers while the mid-frequencies are output partially directly and partially as a dipole. Similarly, bass and treble frequencies of the right output signal are output directly via one or more first side-firing transducers while the mid-frequencies are output partially directly and partially as a dipole. The center audio signal is output directly via the forward-firing transducer. Such reproduction achieves first order directionality at frequencies down to ~300 Hz, which is lower than certain other techniques.

As indicated above, example playback devices may include a housing that carries multiple audio transducers. The audio transducers may include a forward-firing transducer, one or more first side-firing transducers, and one or more second side-firing transducers. The one or more first side-firing transducers and one or more second side-firing transducers may be arranged such that they direct their respective outputs in opposite directions (i.e., 180° from one another). The forward-firing transducer may then be arranged to output orthogonally to the output of the first side-firing transducers and the second side-firing transducers (i.e., 90° from the output of the side-firing transducers). Within examples, the audio transducers are individually drivable via one or more amplifiers of the playback device so as to individually reproduce the audio signals, such as the left output signal, the right output signal, and the center signal introduced above.

In further examples, the one or more first side-firing transducers and one or more second side-firing transducers may be arranged such that they direct their respective outputs in not quite fully opposite directions. For instance, the side-firing transducers may be arranged in a 'V' pattern. In such an example, the side-firing transducers may direct their output at a lesser angle than 180° from one another, such as at 120° (and 60° from the output for the forward-firing transducer). Other examples are possible as well.

In some cases, a playback device may be positioned with a wall or other obstruction within a minimum threshold distance (e.g., 30 cm) to one or more of the side-firing transducers. In such cases, maximum directionality from these side-firing transducer(s) might not be desirable, as the directing the transducer's output towards the obstruction may distort or otherwise interfere with the output. In such examples, the playback devices may self-correct their output to avoid at least some of the effects of the obstruction.

Within examples, when an obstruction is detected, the playback device may use a steering technique to direct the output away from its "natural" output pattern and in a direction that is less affected by the obstruction. For instance, assuming an obstruction to the right side, the playback device may increase the gain of the forward-firing transducer relative to the right-facing side-firing transducer, which "steers" the combined output of the transducers away from the right side (and the obstruction). The amount of steering may depend on the size and location of the obstruction relative to the playback device (which impacts the degree of distortion caused).

The playback device may detect the obstruction using a suitable technique. For instance, the play back device may include one or more microphones, which it may use to capture its own output. By analyzing this captured output for distortions, the playback device may detect the presence of an obstruction in proximity to (e.g., less than 30 cm from) the audio transducer. In further examples, the playback device may include one or more sensors (e.g., a IR LED infrared or ultrasonic sensor) to more directly detect the distance from the playback device to any obstruction(s) that are proximate to the playback device.

As noted above, example techniques relate to calibration of playback devices. An example implementation involves a playback device comprising audio transducers comprising a forward-firing transducer, one or more first side-firing transducers, and one or more second side-firing transducers, a network interface, at least one processor, and a housing carrying the audio transducers, network interface, the at least one processor, and data storage. The playback device is configured to receive data representing stereo audio content, the stereo audio content comprising a left channel and a right channel; up-mix the left channel and the right channel to generate a left audio signal, a right audio signal, and a center audio signal; filter a mid-frequency band from the left audio signal and the right audio signal; generate a dipole from the mid-frequency bands filtered from the left audio signal and the right audio signal; combine the generated dipole with (a) the filtered left audio signal to generate a left output signal and (b) the filtered right audio signal to generate a right output signal; and output (i) the left output signal via the one or more first side-firing transducers, (ii) the right output signal via the one or more second side-firing transducers, and (iii) the center audio signal via the forward-firing transducer.

While some embodiments described herein may refer to functions performed by given actors, such as "users" and/or other entities, it should be understood that this description is for purposes of explanation only. The claims should not be interpreted to require action by any such example actor unless explicitly required by the language of the claims themselves.

Moreover, some functions are described herein as being performed "based on" or "in response to" another element or function. "Based on" should be understood that one element or function is related to another function or element. "In response to" should be understood that one element or function is a necessary result of another function or element. For the sake of brevity, functions are generally described as being based on another function when a functional link exists; however, such disclosure should be understood as disclosing either type of functional relationship.

II. Example Operation Environment

Figure 1B:
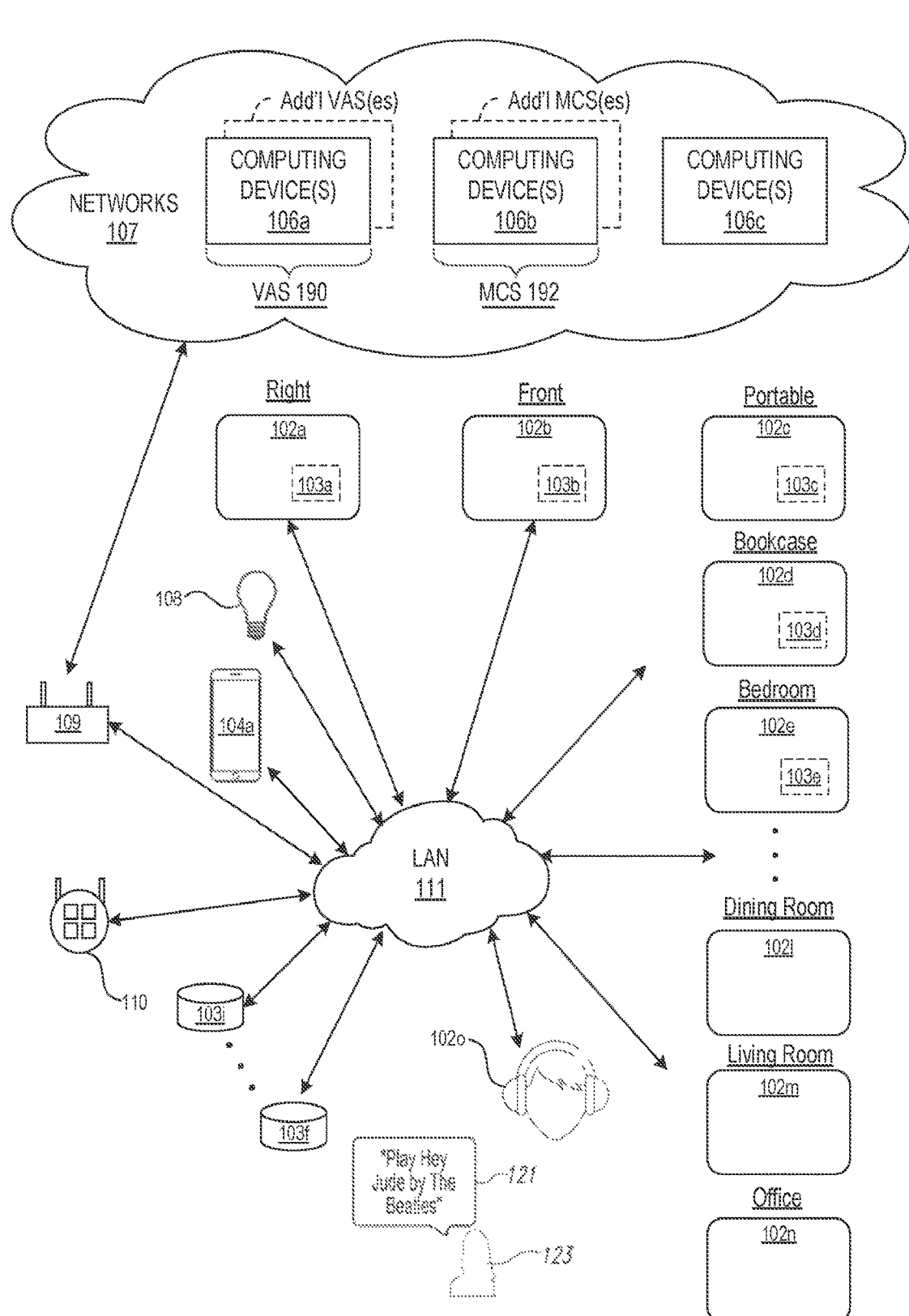
FIG. 1B is a schematic diagram of the media playback system of FIG. 1A and one or more networks.

FIGS. 1A and 1B illustrate an example configuration of a media play back system 100 (or "MPS 100") in which one or more embodiments disclosed herein may be implemented. Referring first to FIG. 1A, the MPS 100 as shown is associated with an example home environment having a plurality of rooms and spaces, which may be collectively referred to as a "home environment," "smart home," or "environment 101." The environment 101 comprises a household having several rooms, spaces, and/or playback zones, including a master bathroom 101a, a master bedroom 101b, (referred to herein as "Nick's Room"), a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102a-102o), network microphone devices 103 (identified individually as "NMDs" 103a-102i), and controller devices 104a and 104b (collectively "controller devices 104"). Referring to FIG. 1B, the home environment may include additional and/or other computing devices, including local network devices, such as one or more smart illumination devices 108 (FIG. 1B), a smart thermostat 110, and a local computing device 105 (FIG. 1A).

In embodiments described below, one or more of the various playback devices 102 may be configured as portable playback devices, while others may be configured as stationary playback devices. For example, the headphones 102o (FIG. 1B) are a portable playback device, while the playback device 102d on the bookcase may be a stationary device. As another example, the playback device 102c on the Patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices 102, 103, and 104 and/or other network devices of the MPS 100 may be coupled to one another via point-to-point connections and/or over other connections, which may be wired and/or wireless, via a network 111, such as a LAN including a network router 109. For example, the playback device 102j in the Den 101d (FIG. 1A), which may be designated as the "Left" device, may have a point-to-point connection with the playback device 102a, which is also in the Den 101d and may be designated as the "Right" device. In a related embodiment, the Left playback device 102j may communicate with other network devices, such as the playback device 102b, which may be designated as the "Front" device, via a point-to-point connection and/or other connections via the NETWORK 111.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the home environment 101.

In some implementations, the various playback devices, NMDs, and/or controller devices 102-104 may be communicatively coupled to at least one remote computing device associated with a VAS and at least one remote computing device associated with a media content service ("MCS"). For instance, in the illustrated example of FIG. 1B, remote computing devices 106 are associated with a VAS 190 and remote computing devices 106b are associated with an MCS 192. Although only a single VAS 190 and a single MCS 192 are shown in the example of FIG. 1B for purposes of clarity, the MPS 100 may be coupled to multiple, different VASes and/or MCSes. In some implementations, VASes may be operated by one or more of AMAZON, GOOGLE, APPLE, MICROSOFT, SONOS or other voice assistant providers. In some implementations, MCSes may be operated by one or more of SPOTIFY, PANDORA, AMAZON MUSIC, or other media content services.

As further shown in FIG. 1B, the remote computing devices 106 further include remote computing device 106c configured to perform certain operations, such as remotely facilitating media playback functions, managing device and system status information, directing communications between the devices of the MPS 100 and one or multiple VASes and/or MCSes, among other operations. In one example, the remote computing devices 106c provide cloud servers for one or more SONOS Wireless HiFi Systems.

In various implementations, one or more of the playback devices 102 may take the form of or include an on-board (e.g., integrated) network microphone device. For example, the playback devices 102a-e include or are otherwise equipped with corresponding NMDs 103a-e, respectively. A playback device that includes or is equipped with an NMD may be referred to herein interchangeably as a playback device or an NMD unless indicated otherwise in the description. In some cases, one or more of the NMDs 103 may be a stand-alone device. For example, the NMDs 103f and 103g may be stand-alone devices. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 102 and 103 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 102d because it is physically situated on a bookcase. Similarly, the NMD 103f may be assigned the named "Island" because it is physically situated on an island countertop in the Kitchen 101h (FIG. 1A). Some playback devices may be assigned names according to a zone or room, such as the playback devices 102e, 102l, 102m, and 102n, which are named "Bedroom," "Dining Room," "Living Room," and "Office," respectively. Further, certain playback devices may have functionally descriptive names. For example, the playback devices 102a and 102b are assigned the names "Right" and "Front," respectively, because these two devices are configured to provide specific audio channels during media playback in the zone of the Den 101d (FIG. 1A). The playback device 102c in the Patio may be named portable because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 103 are configured to interact with the VAS 190 over a network via the network 111 and the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 102-105 (FIG. 1A) and/or remote computing devices 106c of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the MPS 100 may exchange data via communication paths as described herein and/or using a metadata exchange channel as described in U.S. application Ser. No. 15/438,749 filed Feb. 21, 2017, and titled "Voice Control of a Media Playback System," which is herein incorporated by reference in its entirety.

Upon receiving the stream of sound data, the VAS 190 determines if there is voice input in the streamed data from the NMD, and if so the VAS 190 will also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 102d in the environment 101 (FIG. 1A) is in relatively close proximity to the NMD-equipped Living Room playback device 102m, and both devices 102d and 102m may at least sometimes detect the same sound. In such cases, this may require arbitration as to which device is ultimately responsible for providing detected-sound data to the remote VAS. Examples of arbitrating between NMDs may be found, for example, in previously referenced U.S. application Ser. No. 15/438,749.

In certain implementations, an NMD may be assigned to, or otherwise associated with, a designated or default playback device that may not include an NMD. For example, the Island NMD 103f in the Kitchen 101h (FIG. 1A) may be assigned to the Dining Room playback device 102l, which is in relatively close proximity to the Island NMD 103f. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. Patent Application No.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback, network microphone, and/or controller devices 102-104. For example, the technologies herein may be utilized within an environment having a single playback device 102 and/or a single NMD 103. In some examples of such cases, the NETWORK 111 (FIG. 1B) may be eliminated and the single playback device 102 and/or the single NMD 103 may communicate directly with the remote computing devices 106-*d*. In some embodiments, a telecommunication network (e.g., an LTE network, a 5G network, etc.) may communicate with the various playback, network microphone, and/or controller devices 102-104 independent of a LAN.

a. Example Playback & Network Microphone Devices

Figure 2A:
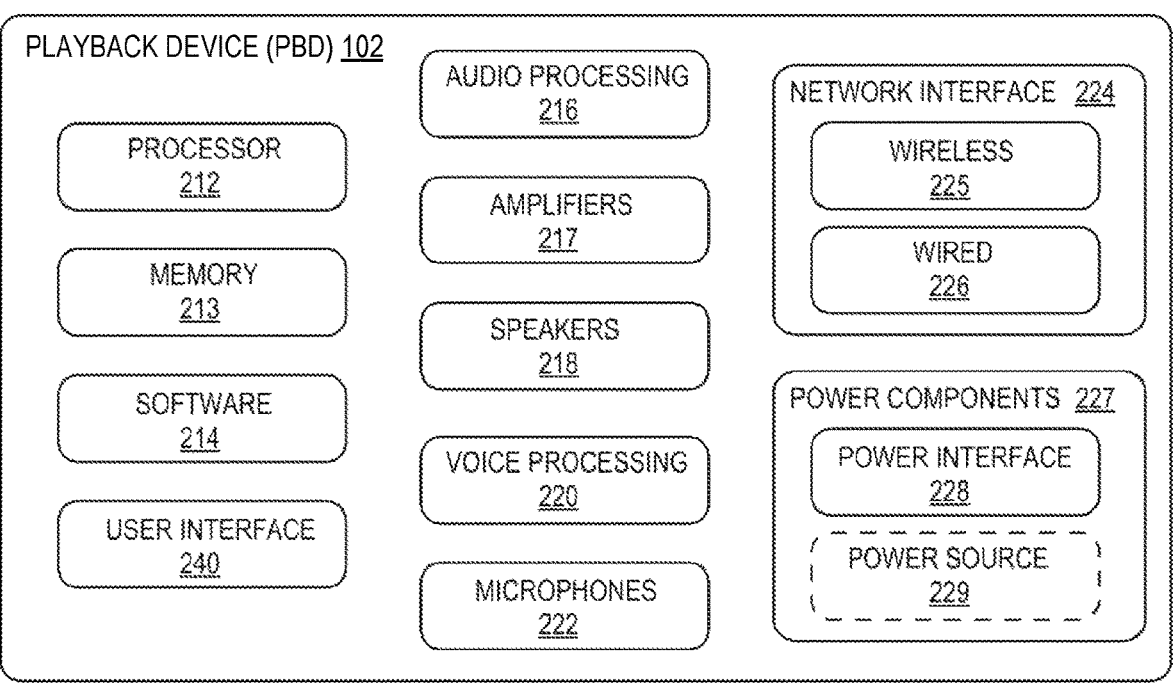
FIG. 2A is a functional block diagram of an example playback device.

FIG. 2A is a functional block diagram illustrating certain aspects of one of the playback devices 102 of the MPS 100 of FIGS. 1A and 1B. As shown, the playback device 102 includes various components, each of which is discussed in further detail below, and the various components of the playback device 102 may be operably coupled to one another via a system bus, communication network, or some other connection mechanism. In the illustrated example of FIG. 2A, the playback device 102 may be referred to as an "NMD-equipped" playback device because it includes components that support the functionality of an NMD, such as one of the NMDs 103 shown in FIG. 1A.

As shown, the playback device 102 includes at least one processor 212, which may be a clock-driven computing component configured to process input data according to instructions stored in memory 213. The memory 213 may be a tangible, non-transitory, computer-readable medium configured to store instructions that are executable by the processor 212. For example, the memory 213 may be data storage that can be loaded with software code 214 that is executable by the processor 212 to achieve certain functions.

In one example, these functions may involve the playback device 102 retrieving audio data from an audio source, which may be another playback device. In another example, the functions may involve the playback device 102 sending audio data, detected-sound data (e.g., corresponding to a voice input), and/or other information to another device on a network via at least one network interface 224. In yet another example, the functions may involve the playback device 102 causing one or more other playback devices to synchronously playback audio with the playback device 102. In yet a further example, the functions may involve the playback device 102 facilitating being paired or otherwise bonded with one or more other playback devices to create a multi-channel audio environment. Numerous other example functions are possible, some of which are discussed below.

As just mentioned, certain functions may involve the playback device 102 synchronizing playback of audio content with one or more other playback devices. During synchronous playback, a listener may not perceive time-delay differences between playback of the audio content by the synchronized playback devices. U.S. Pat. No. 8,234,395 filed on Apr. 4, 2004, and titled "System and method for synchronizing operations among a plurality of independently clocked digital data processing devices," which is hereby incorporated by reference in its entirety, provides in more detail some examples for audio playback synchronization among playback devices.

To facilitate audio playback, the playback device 102 includes audio processing components 216 that are generally configured to process audio prior to the playback device 102 rendering the audio. In this respect, the audio processing components 216 may include one or more digital-to-analog converters ("DAC"), one or more audio preprocessing components, one or more audio enhancement components, one or more digital signal processors ("DSPs"), and so on. In some implementations, one or more of the audio processing components 216 may be a subcomponent of the processor 212. In operation, the audio processing components 216 receive analog and/or digital audio and process and/or otherwise intentionally alter the audio to produce audio signals for playback.

The produced audio signals may then be provided to one or more audio amplifiers 217 for amplification and playback through one or more speakers 218 operably coupled to the amplifiers 217. The audio amplifiers 217 may include components configured to amplify audio signals to a level for driving one or more of the speakers 218.

Each of the speakers 218 may include an individual transducer (e.g., a "driver") or the speakers 218 may include a complete speaker system involving an enclosure with one or more drivers. A particular driver of a speaker 218 may include, for example, a subwoofer (e.g., for low frequencies), a mid-range driver (e.g., for middle frequencies), and/or a tweeter (e.g., for high frequencies). In some cases, a transducer may be driven by an individual corresponding audio amplifier of the audio amplifiers 217. In some implementations, a playback device may not include the speakers 218, but instead may include a speaker interface for connecting the playback device to external speakers. In certain embodiments, a playback device may include neither the speakers 218 nor the audio amplifiers 217, but instead may include an audio interface (not shown) for connecting the playback device to an external audio amplifier or audio-visual receiver.

In addition to producing audio signals for playback by the playback device 102, the audio processing components 216 may be configured to process audio to be sent to one or more other playback devices, via the network interface 224, for playback. In example scenarios, audio content to be processed and/or played back by the playback device 102 may be received from an external source, such as via an audio line-in interface (e.g., an auto-detecting 3.5 mm audio line-in connection) of the playback device 102 (not shown) or via the network interface 224, as described below.

As shown, the at least one network interface 224, may take the form of one or more wireless interfaces 225 and/or one or more wired interfaces 226. A wireless interface may provide network interface functions for the playback device 102 to wirelessly communicate with other devices (e.g., other playback device(s), NMD(s), and/or controller device(s)) in accordance with a communication protocol (e.g., any wireless standard including IEEE 802.11a, 802.11b, 802.11g, 802.11n, 802.11ac, 802.15, 4G mobile communication standard, and so on). A wired interface may provide network interface functions for the playback device 102 to communicate over a wired connection with other devices in accordance with a communication protocol (e.g., IEEE 802.3). While the network interface 224 shown in FIG. 2A include both wired and wireless interfaces, the playback device 102 may in some implementations include only wireless interface(s) or only wired interface(s).

In general, the network interface 224 facilitates data flow between the playback device 102 and one or more other devices on a data network. For instance, the playback device 102 may be configured to receive audio content over the data network from one or more other playback devices, network devices within a LAN, and/or audio content sources over a WAN, such as the Internet. In one example, the audio content and other signals transmitted and received by the playback device 102 may be transmitted in the form of digital packet data comprising an Internet Protocol (IP)-based source address and IP-based destination addresses. In such a case, the network interface 224 may be configured to parse the digital packet data such that the data destined for the playback device 102 is properly received and processed by the playback device 102.

As shown in FIG. 2A, the playback device 102 also includes voice processing components 220 that are operably coupled to one or more microphones 222. The microphones 222 are configured to detect sound (i.e., acoustic waves) in the environment of the playback device 102, which is then provided to the voice processing components 220. More specifically, each microphone 222 is configured to detect sound and convert the sound into a digital or analog signal representative of the detected sound, which can then cause the voice processing component 220 to perform various functions based on the detected sound, as described in greater detail below. In one implementation, the microphones 222 are arranged as an array of microphones (e.g., an array of six microphones). In some implementations, the playback device 102 includes more than six microphones (e.g., eight microphones or twelve microphones) or fewer than six microphones (e.g., four microphones, two microphones, or a single microphones).

In operation, the voice-processing components 220 are generally configured to detect and process sound received via the microphones 222, identify potential voice input in the detected sound, and extract detected-sound data to enable a VAS, such as the VAS 190 (FIG. 1B), to process voice input identified in the detected-sound data. The voice processing components 220 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 220 may include or otherwise take the form of one or more DSPs or one or more modules of a DSP. In this respect, certain voice processing components 220 may be configured with particular parameters (e.g., gain and/or spectral parameters) that may be modified or otherwise tuned to achieve particular functions. In some implementations, one or more of the voice processing components 220 may be a subcomponent of the processor 212.

As further shown in FIG. 2A, the playback device 102 also includes power components 227. The power components 227 include at least an external power source interface 228, which may be coupled to a power source (not shown) via a power cable or the like that physically connects the playback device 102 to an electrical outlet or some other external power source. Other power components may include, for example, transformers, converters, and like components configured to format electrical power.

In some implementations, the power components 227 of the playback device 102 may additionally include an internal power source 229 (e.g., one or more batteries) configured to power the playback device 102 without a physical connection to an external power source. When equipped with the internal power source 229, the playback device 102 may operate independent of an external power source. In some such implementations, the external power source interface 228 may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The playback device 102 further includes a user interface 240 that may facilitate user interactions independent of or in conjunction with user interactions facilitated by one or more of the controller devices 104. In various embodiments, the user interface 240 includes one or more physical buttons and/or supports graphical interfaces provided on touch sensitive screen(s) and/or surface(s), among other possibilities, for a user to directly provide input. The user interface 240 may further include one or more of lights (e.g., LEDs) and the speakers to provide visual and/or audio feedback to a user.

Figure 2B:
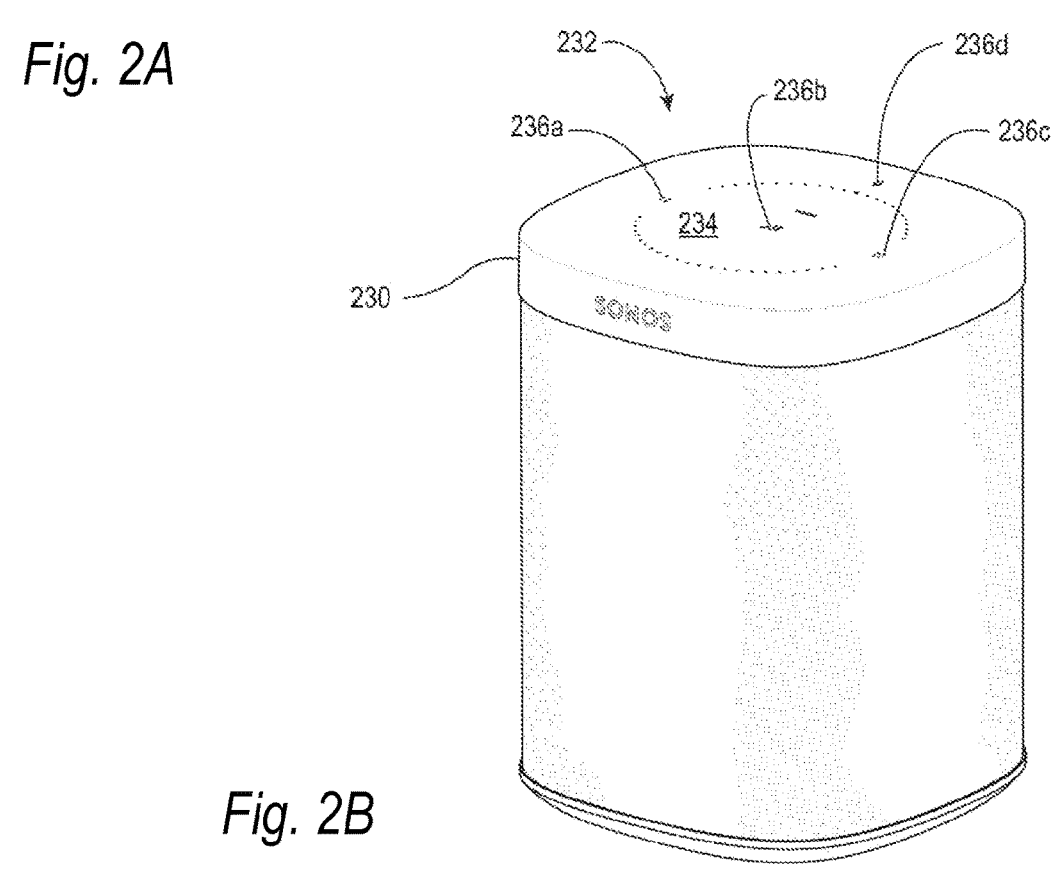
FIG. 2B is an isometric diagram of an example housing of the playback device of FIG. 2A.

As an illustrative example, FIG. 2B shows an example housing 230 of the playback device 102 that includes a user interface in the form of a control area 232 at a top portion 234 of the housing 230. The control area 232 includes buttons 236a-c for controlling audio playback, volume level, and other functions. The control area 232 also includes a button 236d for toggling the microphones 222 to either an on state or an off state.

As further shown in FIG. 2B, the control area 232 is at least partially surrounded by apertures formed in the top portion 234 of the housing 230 through which the microphones 222 (not visible in FIG. 2B) receive the sound in the environment of the playback device 102. The microphones 222 may be arranged in various positions along and/or within the top portion 234 or other areas of the housing 230 so as to detect sound from one or more directions relative to the playback device 102.

By way of illustration, SONOS, Inc. presently offers (or has offered) for sale certain playback devices that may implement certain of the embodiments disclosed herein, including a "PLAY:1," "PLAY:3," "PLAY:5," "PLAYBAR," "CONNECT:AMP," "PLAYBASE," "BEAM," "CONNECT," and "SUB." Any other past, present, and/or future playback devices may additionally or alternatively be used to implement the playback devices of example embodiments disclosed herein. Additionally, it should be understood that a playback device is not limited to the examples illustrated in FIG. 2A or 2B or to the SONOS product offerings. For example, a playback device may include, or otherwise take the form of, a wired or wireless headphone set, which may operate as a part of the MPS 100 via a network interface or the like. In another example, a playback device may include or interact with a docking station for personal mobile media playback devices. In yet another example, a playback device may be integral to another device or component such as a television, a lighting fixture, or some other device for indoor or outdoor use.

Figure 2C:
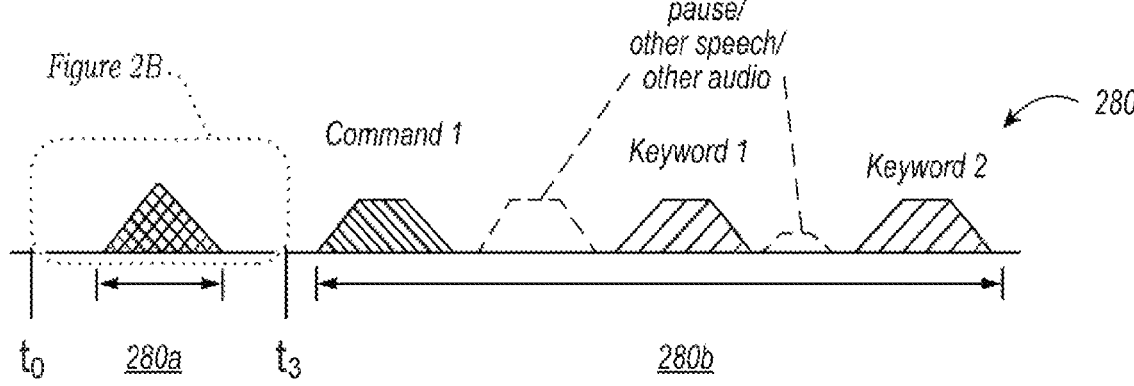
FIG. 2C is a diagram of an example voice input.

FIG. 2C is a diagram of an example voice input 280 that may be processed by an NMD or an NMD-equipped playback device. The voice input 280 may include a keyword portion 280a and an utterance portion 280b. The keyword portion 280a may include a wake word or a local keyword.

In the case of a wake word, the keyword portion 280a corresponds to detected sound that caused a VAS wake-word event. In practice, a wake word is typically a predetermined nonce word or phrase used to "wake up" an NMD and cause it to invoke a particular voice assistant service ("VAS") to interpret the intent of voice input in detected sound. For example, a user might speak the wake word "Alexa" to invoke the AMAZON® VAS, "Ok, Google" to invoke the GOOGLE® VAS, or "Hey, Siri" to invoke the APPLE® VAS, among other examples. In practice, a wake word may also be referred to as, for example, an activation-, trigger-, wakeup-word or -phrase, and may take the form of any suitable word, combination of words (e.g., a particular phrase), and/or some other audio cue.

The utterance portion 280b corresponds to detected sound that potentially comprises a user request following the keyword portion 280a. An utterance portion 280b can be processed to identify the presence of any words in detected-sound data by the NMD in response to the event caused by the keyword portion 280a. In various implementations, an underlying intent can be determined based on the words in the utterance portion 280b. In certain implementations, an underlying intent can also be based or at least partially based on certain words in the keyword portion 280a, such as when keyword portion includes a command keyword. In any case, the words may correspond to one or more commands, as well as a certain command and certain keywords.

A keyword in the voice utterance portion 280b may be, for example, a word identifying a particular device or group in the MPS 100. For instance, in the illustrated example, the keywords in the voice utterance portion 280b may be one or more words identifying one or more zones in which the music is to be played, such as the Living Room and the Dining Room (FIG. 1A). In some cases, the utterance portion 280b may include additional information, such as detected pauses (e.g., periods of non-speech) between words spoken by a user, as shown in FIG. 2C. The pauses may demarcate the locations of separate commands, keywords, or other information spoke by the user within the utterance portion 280b.

Based on certain command criteria, the NMD and/or a remote VAS may take actions as a result of identifying one or more commands in the voice input. Command criteria may be based on the inclusion of certain keywords within the voice input, among other possibilities. Additionally, state and/or zone-state variables in conjunction with identification of one or more particular commands. Control-state variables may include, for example, indicators identifying a level of volume, a queue associated with one or more devices, and playback state, such as whether devices are playing a queue, paused, etc. Zone-state variables may include, for example, indicators identifying which, if any, zone players are grouped.

In some implementations, the MPS 100 is configured to temporarily reduce the volume of audio content that it is playing upon detecting a certain keyword, such as a wake word, in the keyword portion 280a. The MPS 100 may restore the volume after processing the voice input 280. Such a process can be referred to as ducking, examples of which are disclosed in U.S. patent application Ser. No. 15/438,749, incorporated by reference herein in its entirety.

Figure 2D:
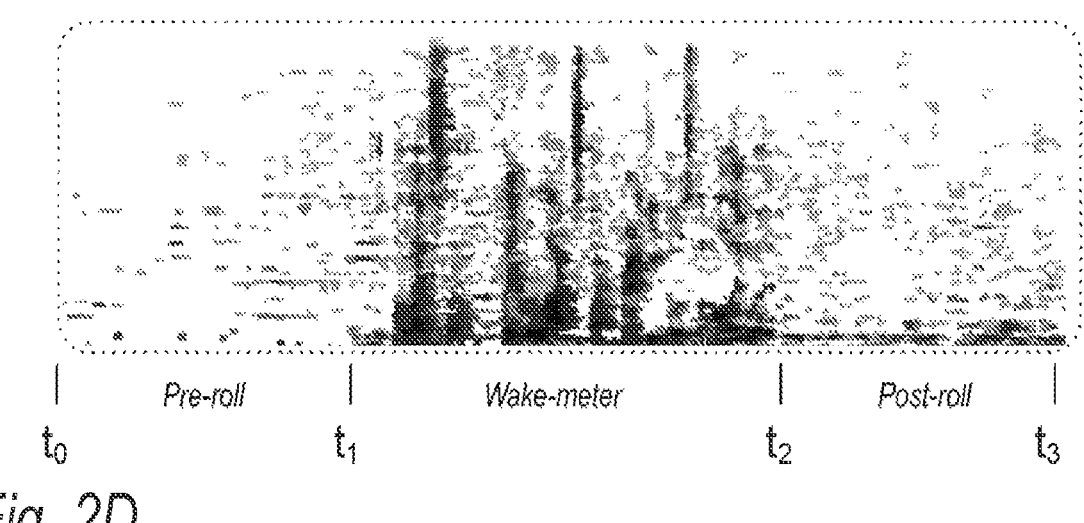
FIG. 2D is a graph depicting an example sound specimen in accordance with aspects of the disclosure.

FIG. 2D shows an example sound specimen. In this example, the sound specimen corresponds to the sound-data stream (e.g., one or more audio frames) associated with a spotted wake word or command keyword in the keyword portion 280a of FIG. 2A. As illustrated, the example sound specimen comprises sound detected in an NMD's environment (i) immediately before a wake or command word was spoken, which may be referred to as a pre-roll portion (between times $t_0$ and $t_1$), (ii) while a wake or command word was spoken, which may be referred to as a wake-meter portion (between times $t_1$ and $t_2$), and/or (iii) after the wake or command word was spoken, which may be referred to as a post-roll portion (between times $t_2$ and $t_3$). Other sound specimens are also possible. In various implementations, aspects of the sound specimen can be evaluated according to an acoustic model which aims to map mels/spectral features to phonemes in a given language model for further processing. For example, automatic speech recognition (ASR) may include such mapping for command-keyword detection. Wake-word detection engines, by contrast, may be precisely tuned to identify a specific wake-word, and a downstream action of invoking a VAS (e.g., by targeting only nonce words in the voice input processed by the playback device).

ASR for local keyword detection may be tuned to accommodate a wide range of keywords (e.g., 5, 10, 100, 1,000, 10,000 keywords). Local keyword detection, in contrast to wake-word detection, may involve feeding ASR output to an onboard, local NLU which together with the ASR determine when local keyword events have occurred. In some implementations described below, the local NLU may determine an intent based on one or more keywords in the ASR output produced by a particular voice input. In these or other implementations, a playback device may act on a detected command keyword event only when the playback devices determines that certain conditions have been met, such as environmental conditions (e.g., low background noise).

b. Example Playback Device Configurations

FIGS. 3A-3E show example configurations of playback devices. Referring first to FIG. 3A, in some example instances, a single playback device may belong to a zone. For example, the playback device 102c (FIG. 1A) on the Patio may belong to Zone A. In some implementations described below, multiple playback devices may be "bonded" to form a "bonded pair," which together form a single zone. For example, the playback device 102f (FIG. 1A) named "Bed 1" in FIG. 3A may be bonded to the playback device 102g (FIG. 1A) named "Bed 2" in FIG. 3A to form Zone B. Bonded playback devices may have different playback responsibilities (e.g., channel responsibilities). In another implementation described below, multiple playback devices may be merged to form a single zone. For example, the playback device 102d named "Bookcase" may be merged with the playback device 102m named "Living Room" to form a single Zone C. The merged playback devices 102d and 102m may not be specifically assigned different playback responsibilities. That is, the merged playback devices 102d and 102m may, aside from playing audio content in synchrony, each play audio content as they would if they were not merged.

For purposes of control, each zone in the MPS 100 may be represented as a single user interface ("UI") entity. For example, as displayed by the controller devices 104, Zone A may be provided as a single entity named "Portable," Zone B may be provided as a single entity named "Stereo," and Zone C may be provided as a single entity named "Living Room."

In various embodiments, a zone may take on the name of one of the playback devices belonging to the zone. For example, Zone C may take on the name of the Living Room device 102m (as shown). In another example, Zone C may instead take on the name of the Bookcase device 102d. In a further example, Zone C may take on a name that is some combination of the Bookcase device 102d and Living Room device 102m. The name that is chosen may be selected by a user via inputs at a controller device 104. In some embodiments, a zone may be given a name that is different than the device(s) belonging to the zone. For example, Zone B in FIG. 3A is named "Stereo" but none of the devices in Zone B have this name. In one aspect, Zone B is a single UI entity representing a single device named "Stereo," composed of constituent devices "Bed 1" and "Bed 2." In one implementation, the Bed 1 device may be playback device 102*f* in the master bedroom 101*h* (FIG. 1A) and the Bed 2 device may be the playback device 102*g* also in the master bedroom 101*h* (FIG. 1A).

As noted above, playback devices that are bonded may have different playback responsibilities, such as playback responsibilities for certain audio channels. For example, as shown in FIG. 3B, the Bed 1 and Bed 2 devices 102*f* and 102*g* may be bonded so as to produce or enhance a stereo effect of audio content. In this example, the Bed 1 playback device 102*f* may be configured to play a left channel audio component, while the Bed 2 playback device 102*g* may be configured to play a right channel audio component. In some implementations, such stereo bonding may be referred to as "pairing."

Additionally, playback devices that are configured to be bonded may have additional and/or different respective speaker drivers. As shown in FIG. 3C, the playback device 102*b* named "Front" may be bonded with the playback device 102*k* named "SUB." The Front device 102*b* may render a range of mid to high frequencies, and the SUB device 102*k* may render low frequencies as, for example, a subwoofer. When unbonded, the Front device 102*b* may be configured to render a full range of frequencies. As another example, FIG. 3D shows the Front and SUB devices 102*b* and 102*k* further bonded with Right and Left playback devices 102*a* and 102*j*, respectively. In some implementations, the Right and Left devices 102*a* and 102*j* may form surround or "satellite" channels of a home theater system. The bonded playback devices 102*a*, 102*b*, 102*j*, and 102*k* may form a single Zone D (FIG. 3A).

In some implementations, playback devices may also be "merged." In contrast to certain bonded playback devices, playback devices that are merged may not have assigned playback responsibilities, but may each render the full range of audio content that each respective playback device is capable of. Nevertheless, merged devices may be represented as a single UI entity (i.e., a zone, as discussed above). For instance, FIG. 3E shows the playback devices 102*d* and 102*m* in the Living Room merged, which would result in these devices being represented by the single UI entity of Zone C. In one embodiment, the playback devices 102*d* and 102*m* may playback audio in synchrony, during which each outputs the full range of audio content that each respective playback device 102*d* and 102*m* is capable of rendering.

In some embodiments, a stand-alone NMD may be in a zone by itself. For example, the NMD 103*h* from FIG. 1A is named "Closet" and forms Zone I in FIG. 3A. An NMD may also be bonded or merged with another device so as to form a zone. For example, the NMD device 103*f* named "Island" may be bonded with the playback device 102*i* Kitchen, which together form Zone F, which is also named "Kitchen." Additional details regarding assigning NMDs and playback devices as designated or default devices may be found, for example, in previously referenced U.S. patent application Ser. No. 15/438,749. In some embodiments, a stand-alone NMD may not be assigned to a zone.

Zones of individual, bonded, and/or merged devices may be arranged to form a set of playback devices that playback audio in synchrony. Such a set of playback devices may be referred to as a "group," "zone group," "synchrony group," or "playback group." In response to inputs provided via a controller device 104, playback devices may be dynamically grouped and ungrouped to form new or different groups that synchronously play back audio content. For example, referring to FIG. 3A, Zone A may be grouped with Zone B to form a zone group that includes the playback devices of the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Grouped and bonded devices are example types of associations between portable and stationary playback devices that may be caused in response to a trigger event, as discussed above and described in greater detail below.

In various implementations, the zones in an environment may be assigned a particular name, which may be the default name of a zone within a zone group or a combination of the names of the zones within a zone group, such as "Dining Room+Kitchen," as shown in FIG. 3A. In some embodiments, a zone group may be given a unique name selected by a user, such as "Nick's Room," as also shown in FIG. 3A. The name "Nick's Room" may be a name chosen by a user over a prior name for the zone group, such as the room name "Master Bedroom."

Referring back to FIG. 2A, certain data may be stored in the memory 213 as one or more state variables that are periodically updated and used to describe the state of a playback zone, the playback device(s), and/or a zone group associated therewith. The memory 213 may also include the data associated with the state of the other devices of the MPS 100, which may be shared from time to time among the devices so that one or more of the devices have the most recent data associated with the system.

In some embodiments, the memory 213 of the playback device 102 may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1A, identifiers associated with the Patio may indicate that the Patio is the only playback device of a particular zone and not in a zone group. Identifiers associated with the Living Room may indicate that the Living Room is not grouped with other zones but includes bonded playback devices 102*a*, 102*b*, 102*j*, and 102*k*. Identifiers associated with the Dining Room may indicate that the Dining Room is part of Dining Room+Kitchen group and that devices 103*f* and 102*i* are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3A. An Area may involve a cluster of zone groups and/or zones not within a zone group. For instance, FIG. 3A shows a first area named "First Area" and a second area named "Second Area." The First Area includes zones and zone groups of the Patio, Den, Dining Room, Kitchen, and Bathroom. The Second Area includes zones and zone groups of the Bathroom, Nick's Room, Bedroom, and Living Room. In one aspect, an Area may be used to invoke a cluster of zone groups and/or zones that share one or more zones and/or zone groups of another cluster. In this respect, such an Area differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the MPS 100 may not implement Areas, in which case the system may not store variables associated with Areas.

The memory 213 may be further configured to store other data. Such data may pertain to audio sources accessible by the playback device 102 or a playback queue that the playback device (or some other playback device(s)) may be associated with. In embodiments described below, the memory 213 is configured to store a set of command data for selecting a particular VAS when processing voice inputs. During operation, one or more playback zones in the environment of FIG. 1A may each be playing different audio content. For instance, the user may be grilling in the Patio zone and listening to hip hop music being played by the playback device 102c, while another user may be preparing food in the Kitchen zone and listening to classical music being played by the playback device 102i. In another example, a playback zone may play the same audio content in synchrony with another playback zone.

For instance, the user may be in the Office zone where the playback device 102n is playing the same hip-hop music that is being playing by playback device 102c in the Patio zone. In such a case, playback devices 102c and 102n may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102c from the Patio zone to the Office zone, the Office zone may now include both the playback devices 102c and 102n. In some cases, the user may pair or group the moved playback device 102c with the Office zone and/or rename the players in the Office zone using, for example, one of the controller devices 104 and/or voice input. As another example, if one or more playback devices 102 are moved to a particular space in the home environment that is not already a playback zone, the moved playback device(s) may be renamed or associated with a playback zone for the particular space.

Further, different playback zones of the MPS 100 may be dynamically combined into zone groups or split up into individual playback zones. For example, the Dining Room zone and the Kitchen zone may be combined into a zone group for a dinner party such that playback devices 102i and 102l may render audio content in synchrony. As another example, bonded playback devices in the Den zone may be split into (i) a television zone and (ii) a separate listening zone. The television zone may include the Front playback device 102b. The listening zone may include the Right, Left, and SUB playback devices 102a, 102j, and 102k, which may be grouped, paired, or merged, as described above. Splitting the Den zone in such a manner may allow one user to listen to music in the listening zone in one area of the living room space, and another user to watch the television in another area of the living room space. In a related example, a user may utilize either of the NMD 103a or 103b (FIG. 1B) to control the Den zone before it is separated into the television zone and the listening zone. Once separated, the listening zone may be controlled, for example, by a user in the vicinity of the NMD 103a, and the television zone may be controlled, for example, by a user in the vicinity of the NMD 103b. As described above, however, any of the NMDs 103 may be configured to control the various playback and other devices of the MPS 100.

c. Example Controller Devices

FIG. 4 is a functional block diagram illustrating certain aspects of a selected one of the controller devices 104 of the MPS 100 of FIG. 1A. Such controller devices may also be referred to herein as a "control device" or "controller." The controller device shown in FIG. 4 may include components that are generally similar to certain components of the network devices described above, such as a processor 412, memory 413 storing program software 414, at least one network interface 424, and one or more microphones 422. In one example, a controller device may be a dedicated controller for the MPS 100. In another example, a controller device may be a network device on which media playback system controller application software may be installed, such as for example, an iPhone™, iPad™ or any other smart phone, tablet, or network device (e.g., a networked computer such as a PC or Mac™).

The memory 413 of the controller device 104 may be configured to store controller application software and other data associated with the MPS 100 and/or a user of the system 100. The memory 413 may be loaded with instructions in software 414 that are executable by the processor 412 to achieve certain functions, such as facilitating user access, control, and/or configuration of the MPS 100. The controller device 104 is configured to communicate with other network devices via the network interface 424, which may take the form of a wireless interface, as described above.

In one example, system information (e.g., such as a state variable) may be communicated between the controller device 104 and other devices via the network interface 424. For instance, the controller device 104 may receive playback zone and zone group configurations in the MPS 100 from a playback device, an NMD, or another network device. Likewise, the controller device 104 may transmit such system information to a playback device or another network device via the network interface 424. In some cases, the other network device may be another controller device.

The controller device 104 may also communicate playback device control commands, such as volume control and audio playback control, to a playback device via the network interface 424. As suggested above, changes to configurations of the MPS 100 may also be performed by a user using the controller device 104. The configuration changes may include adding/removing one or more playback devices to/from a zone, adding/removing one or more zones to/from a zone group, forming a bonded or merged player, separating one or more playback devices from a bonded or merged player, among others.

As shown in FIG. 4, the controller device 104 also includes a user interface 440 that is generally configured to facilitate user access and control of the MPS 100. The user interface 440 may include a touch-screen display or other physical interface configured to provide various graphical controller interfaces, such as the controller interfaces 540a and 540b shown in FIGS. 5A and 5B. Referring to FIGS. 5A and 5B together, the controller interfaces 540a and 540b includes a playback control region 542, a playback zone region 543, a playback status region 544, a playback queue region 546, and a sources region 548. The user interface as shown is just one example of an interface that may be provided on a network device, such as the controller device shown in FIG. 4, and accessed by users to control a media playback system, such as the MPS 100. Other user interfaces of varying formats, styles, and interactive sequences may alternatively be implemented on one or more network devices to provide comparable control access to a media playback system.

The playback control region 542 (FIG. 5A) may include selectable icons (e.g., by way of touch or by using a cursor) that, when selected, cause playback devices in a selected playback zone or zone group to play or pause, fast forward, rewind, skip to next, skip to previous, enter/exit shuffle mode, enter/exit repeat mode, enter/exit cross fade mode, etc. The playback control region 542 may also include selectable icons that, when selected, modify equalization settings and/or playback volume, among other possibilities.

The playback zone region 543 (FIG. 5B) may include representations of playback zones within the MPS 100. The playback zones regions 543 may also include a representation of zone groups, such as the Dining Room+Kitchen zone group, as shown.

In some embodiments, the graphical representations of playback zones may be selectable to bring up additional selectable icons to manage or configure the playback zones in the MPS 100, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the MPS 100 to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface are also possible. The representations of playback zones in the playback zone region 543 (FIG. 5B) may be dynamically updated as playback zone or zone group configurations are modified.

The playback status region 544 (FIG. 5A) may include graphical representations of audio content that is presently being played, previously played, or scheduled to play next in the selected playback zone or zone group. The selected play back zone or zone group may be visually distinguished on a controller interface, such as within the playback zone region 543 and/or the playback status region 544. The graphical representations may include track title, artist name, album name, album year, track length, and/or other relevant information that may be useful for the user to know when controlling the MPS 100 via a controller interface.

The playback queue region 546 may include graphical representations of audio content in a playback queue asso-ciated with the selected playback zone or zone group. In some embodiments, each playback zone or zone group may be associated with a playback queue comprising information corresponding to zero or more audio items for playback by the playback zone or zone group. For instance, each audio item in the playback queue may comprise a uniform resource identifier (URI), a uniform resource locator (URL), or some other identifier that may be used by a playback device in the playback zone or zone group to find and/or retrieve the audio item from a local audio content source or a networked audio content source, which may then be played back by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streamed audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is ini-tially empty, that contains audio items from the first play-back queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue or may be associated with a new playback queue that is empty or contains audio items from the playback queue associated with the established zone group before the established zone group was ungrouped. Similarly, the resulting second play-back zone may be re-associated with the previous second playback queue or may be associated with a new playback queue that is empty or contains audio items from the playback queue associated with the established zone group before the established zone group was ungrouped. Other examples are also possible.

With reference still to FIGS. 5A and 5B, the graphical representations of audio content in the playback queue region 646 (FIG. 5A) may include track titles, artist names, track lengths, and/or other relevant information associated with the audio content in the play back queue. In one example, graphical representations of audio content may be selectable to bring up additional selectable icons to manage and/or manipulate the playback queue and/or audio content represented in the playback queue. For instance, a repre-sented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 548 may include graphical representations of selectable audio content sources and/or selectable voice assistants associated with a corresponding VAS. The VASes may be selectively assigned. In some examples, multiple VASes, such as AMAZON's Alexa, MICROSOFT's Cortana, etc., may be invokable by the same NMD. In some embodiments, a user may assign a VAS exclusively to one or more NMDs. For example, a user may assign a first VAS to one or both of the NMDs 102*a* and 102*b* in the Living Room shown in FIG. 1A, and a second VAS to the NMD 103*f* in the Kitchen. Other examples are possible.

d. Example Audio Content Sources

The audio sources in the sources region 548 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., via a line-in connection). In another example, audio content may be provided to a playback device over a network via one or more other playback devices or network devices. As described in greater detail below, in some embodiments audio content may be provided by one or more media content services.

Example audio content sources may include a memory of one or more playback devices in a media playback system such as the MPS 100 of FIG. 1, local music libraries on one or more network devices (e.g., a controller device, a network-enabled personal computer, or a networked-attached storage ("NAS")), streaming audio services providing audio content via the Internet (e.g., cloud-based music services), or audio sources connected to the media playback system via a line-in input connection on a playback device or network device, among other possibilities.

In some embodiments, audio content sources may be added or removed from a media playback system such as the MPS 100 of FIG. 1A. In one example, an indexing of audio items may be performed whenever one or more audio content sources are added, removed, or updated. Indexing of audio items may involve scanning for identifiable audio items in all folders/directories shared over a network accessible by playback devices in the media playback system and generating or updating an audio content database comprising metadata (e.g., title, artist, album, track length, among others) and other associated information, such as a URI or URL for each identifiable audio item found. Other examples for managing and maintaining audio content sources may also be possible.

Figure 6:
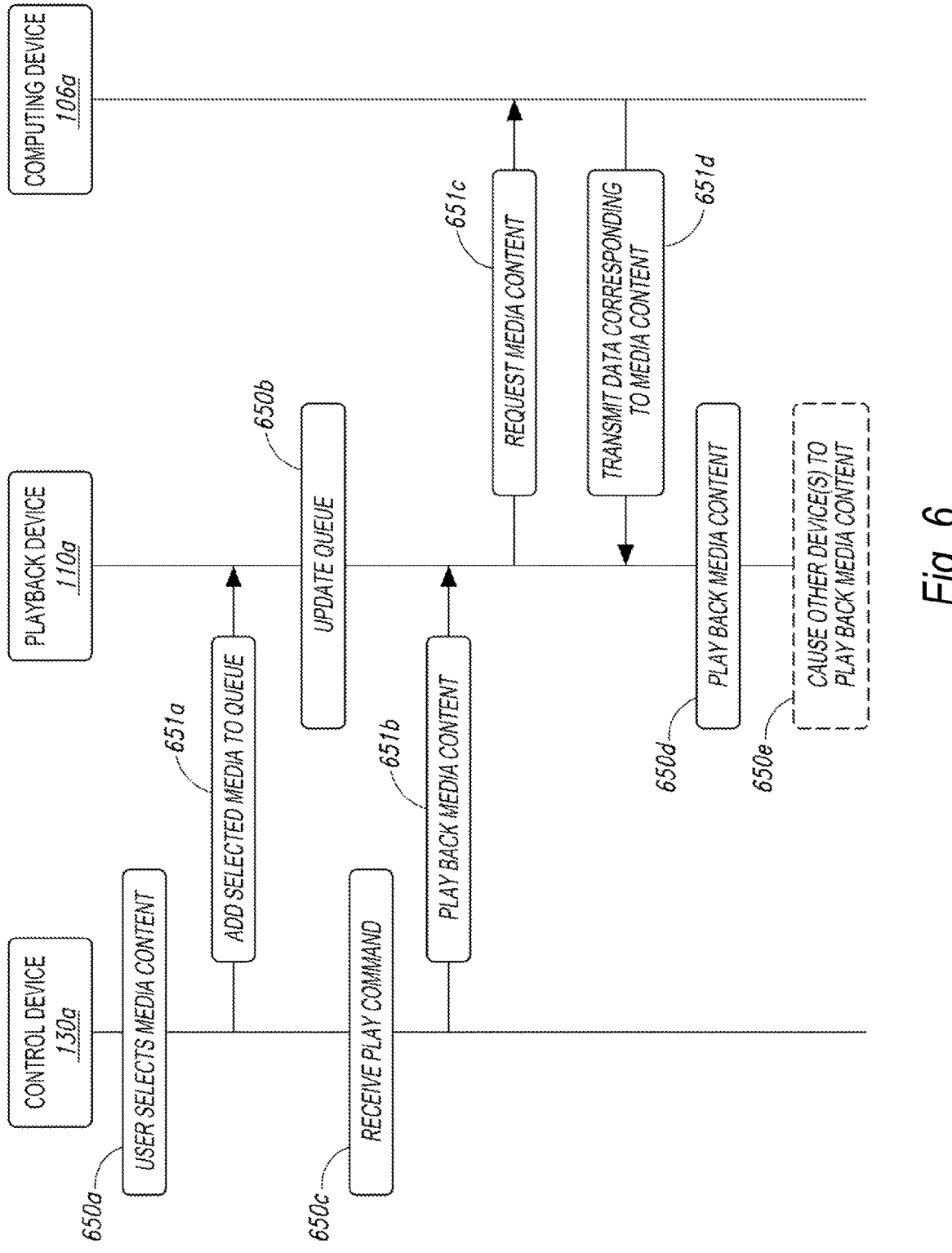
FIG. 6 is a message flow diagram of a media playback system.

FIG. 6 is a message flow diagram illustrating data exchanges between devices of the MPS 100. At step 650*a*, the MPS 100 receives an indication of selected media content (e.g., one or more songs, albums, playlists, podcasts, videos, stations) via the control device 104. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 104 transmits a message 651*a* to the playback device 102 (FIGS. 1A-1C) to add the selected media content to a playback queue on the playback device 102.

At step 650*b*, the playback device 102 receives the message 651*a* and adds the selected media content to the playback queue for play back.

At step 650*c*, the control device 104 receives input corresponding to a command to play back the selected media content. In response to receiving the input corresponding to the command to play back the selected media content, the control device 104 transmits a message 651*b* to the playback device 102 causing the playback device 102 to play back the selected media content. In response to receiving the message 651*b*, the playback device 102 transmits a message 651*c* to the computing device 106 requesting the selected media content. The computing device 106, in response to receiving the message 651*c*, transmits a message 651*d* comprising data (e.g., audio data, video data, a URL, a URI) corresponding to the requested media content.

At step 650*d*, the playback device 102 receives the message 651*d* with the data corresponding to the requested media content and plays back the associated media content.

At step 650*e*, the playback device 102 optionally causes one or more other devices to play back the selected media content. In one example, the playback device 102 is one of a bonded zone of two or more players (FIG. 1M). The playback device 102 can receive the selected media content and transmit all or a portion of the media content to other devices in the bonded zone. In another example, the playback device 102 is a coordinator of a group and is configured to transmit and receive timing information from one or more other devices in the group. The other one or more devices in the group can receive the selected media content from the computing device 106, and begin playback of the selected media content in response to a message from the playback device 102 such that all of the devices in the group play back the selected media content in synchrony.

Within examples, such messages may conform to one or more protocols or interfaces (e.g., an Application Programming Interface). A platform API may support one or more namespaces that include controllable resources (e.g., the playback devices 102 and features thereof). Various functions may modify the resources and thereby control actions on the playback devices 102. For instance, HTTP request methods such as GET and POST may request and modify various resources in a namespace. Example namespaces in a platform API include playback (including controllable resources for playback), playbackMetadata (including metadata resources related to playback), volume (including resources for volume control), playlist (including resources for queue management), and groupVolume (including resources for volume control of a synchrony group), among other examples. Among other examples, such messages may conform to a standard, such as universal-plug-and-play (uPnP).

III. Example Playback Device

Figure 7A:
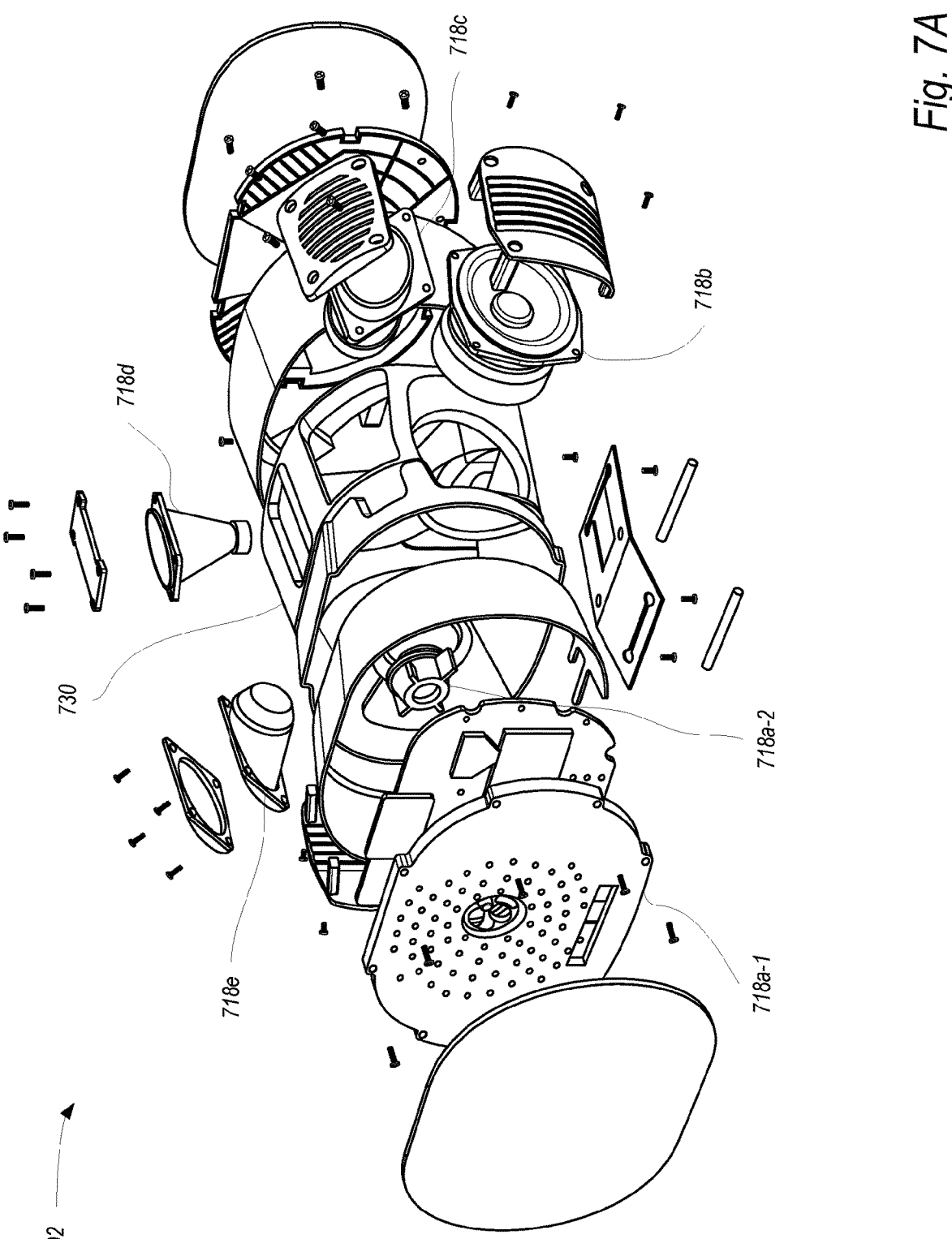
FIGS. 7A, 7B, 7C, and 7D are diagrams showing an example playback device configuration in accordance with aspects of the disclosure.

In example implementations, example spatial imaging techniques described herein may be carried out with a playback device that includes multiple audio transducers. By way of illustration, FIG. 7A is an exploded view of a playback device 702 that includes a plurality of speakers 718. In particular, the speakers 718 include a forward firing transducer 718*a*, a side-firing transducer 718*b*, a side-firing transducer 718*c*, an upward-firing transducer 718*d*, a side-firing transducer 718*e*, and a side-firing transducer 718*f* (not shown). The speakers 718 are carried in a housing 730. The playback device 702 may otherwise include components the same as or similar to the playback device 102 (FIG. 2A), which may be carried by the housing 730.

Figure 7B:
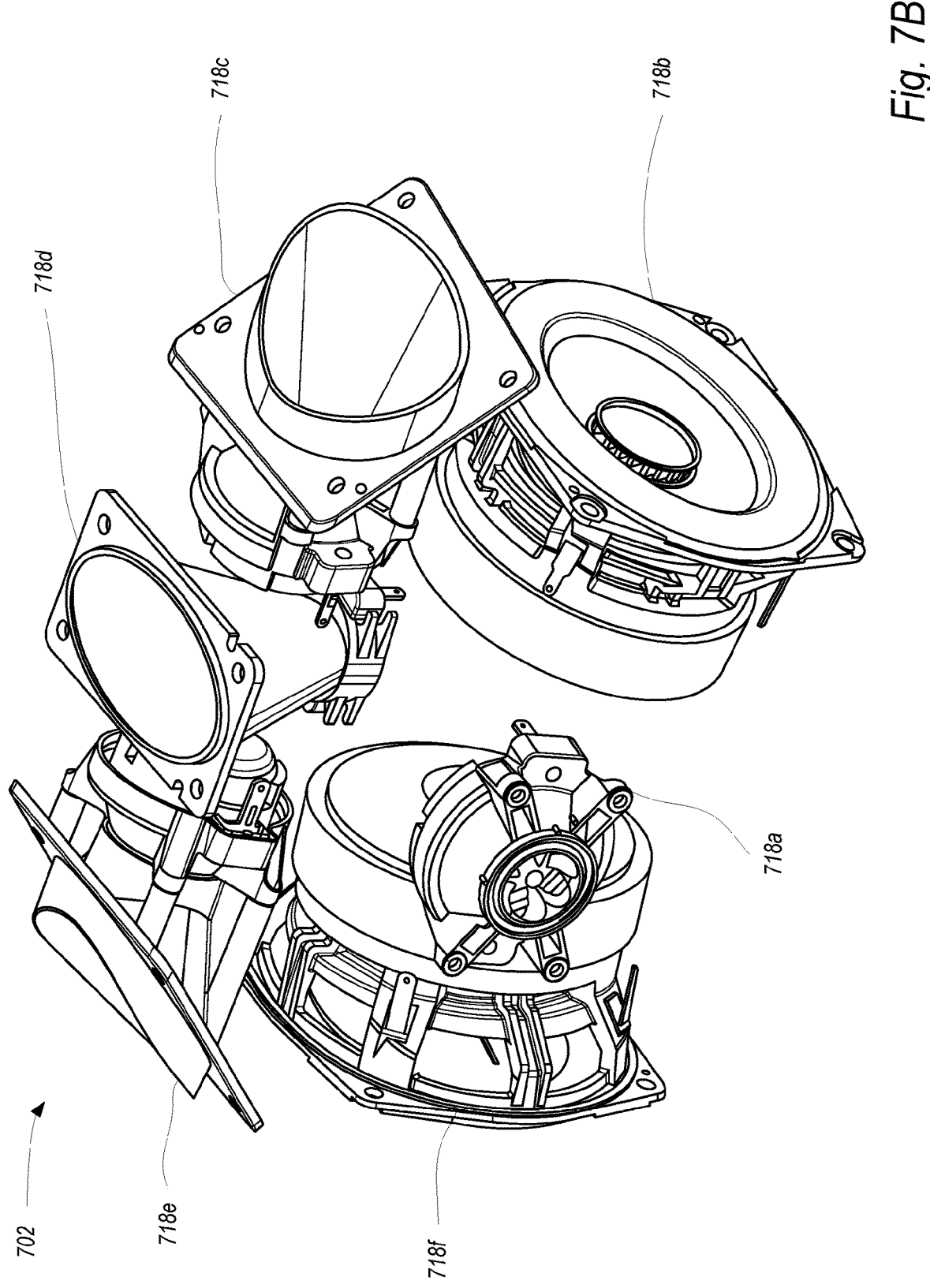

As shown in the exploded view of FIG. 7A, the forward-firing transducer 718*a* is comprised of several components, including a first component 718*a*-1 and a second component 718*a*-*b*. In assembly, the first component 718*a*-1 and the second component 718*a*-*b* are joined to form the forward-firing transducer 718*a*. In other examples, the forward-firing transducer 718*a* may be formed from a single component. Within example implementations, the other speakers 718 as well as the other components may be formed from one or more multiple components as well Within examples, the speakers may have a partial arrangement relative to one another. FIG. 7B is a partial view of the playback device 702 which illustrates the speakers 718 in an example arrangement. As shown, the forward firing transducer 718*a* is oriented in a first direction (i.e., forward). The side-firing transducer 718*b* and the side-firing transducer 718*f* are implemented as respective woofers and are oriented in second and third directions that are approximately 180° from one another and approximately 90° from the first direction in the horizontal plane.

In this example, three of the speakers 718 are implemented as tweeters. These include the side-firing transducer 718*c* and the side-firing transducer 718*e*, which are similarly oriented as the side-firing transducer 718*b* and the side-firing transducer 718*b*. The tweeters also include the upward-firing transducer 718*d*, which is oriented in a fourth direction approximately 90° from the first direction in the vertical plane. As shown, the side-firing transducer 718*c*, the side-firing transducer 718*e*, the upward-firing transducer 718*d* also include respective horns.

The arrangement of the side-firing transducer 718*c* and the side-firing transducer 718*e* provides a widening effect when right and left channels of stereo content are output via the side-firing transducer 718*c* and the side-firing transducer 718*e* respectively. Given the relatively compact size of the playback device 720, this effect is achieved only achieved at higher frequencies (e.g., above a few kHz). Any frequencies where the wavelength is larger than the playback device 702 are reproduced approximately omni-directionally.

The similar arrangement of the side-firing transducers 718*b* and the side-firing transducer 718*f* may have a similar effect. Where, as with the example illustrated here, these the side-firing transducers 718*b* and the side-firing transducer 718*f* are implemented as woofers, the stereo widening effect may be less pronounced given that the woofers are configured to output relatively lower frequency portions of the audio content.

Figure 7C:

To provide further illustration, FIG. 7C is a view showing the playback device 702 as partially-assembled. FIG. 7C shows the housing 730 carrying the side-firing transducer 718*b*, the upward-firing transducer 718*d*, the side-firing transducer 718*e*, and the side-firing transducer 718*e*, as well as the second component 718*a*-2 of the forward-firing transducer 718*a*. The first component 718*a*-1 is not shown in FIG. 7C in order to provide a partial interior view of the housing 730.

Figure 7D:
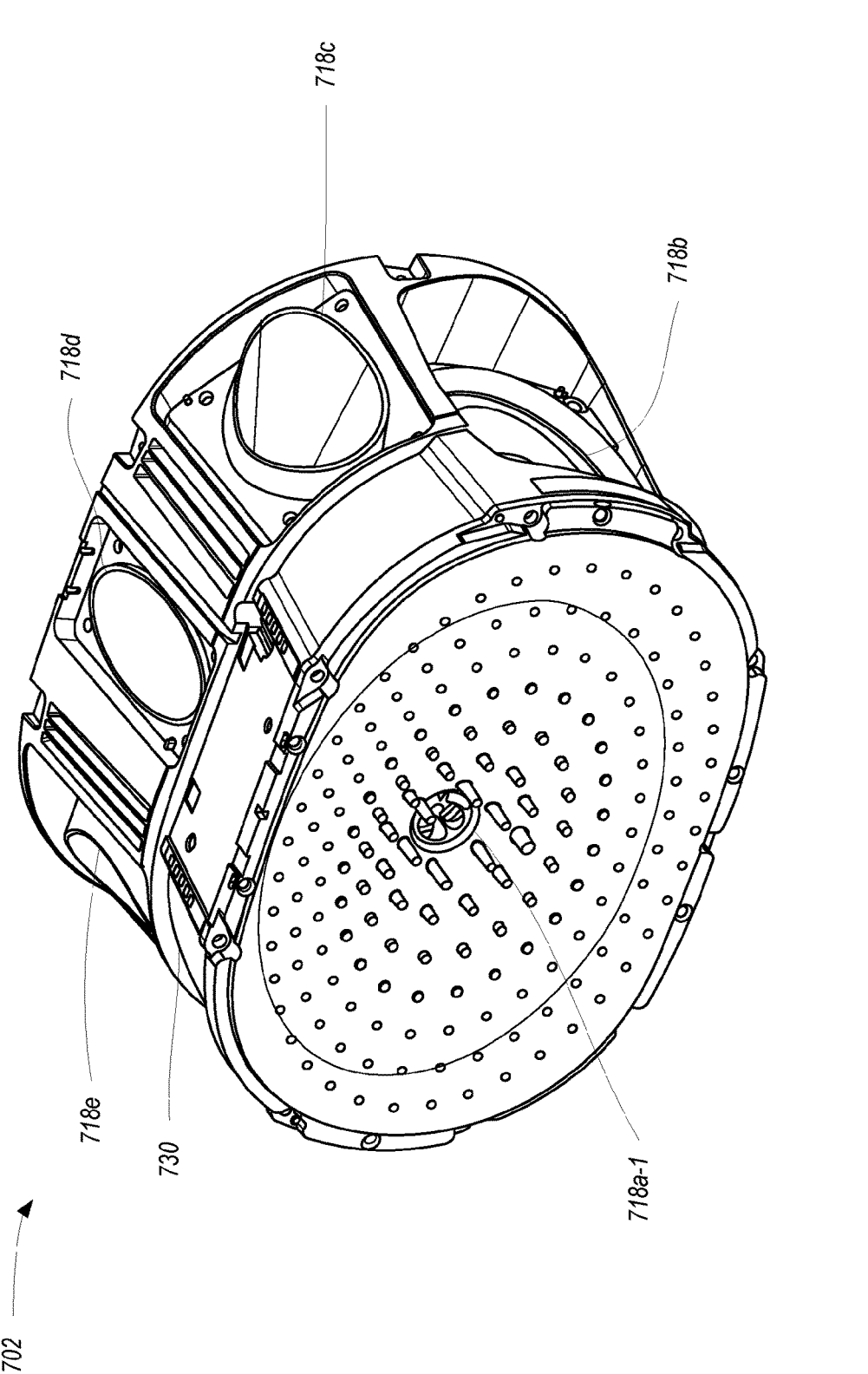

FIG. 7D is a further view showing the playback device 702 also as partially-assembled (without the exterior speakers grilles and trim). FIG. 7D shows the housing 730 carrying the side-firing transducer 718*b*, the side-firing transducer 718*c*, the upward-firing transducer 718*d*, and the side-firing transducer 718*e*. In this view, the first component 718*a*-1 of the forward-firing transducer 718*a* is connected to the second component 718*a*-2.

IV. Example Spatial Imaging

Examples described herein relate to spatial imaging with playback devices having certain arrangements of speakers. In particular, such examples may be used with playback devices that include a forward-firing transducer, at least one first side-firing transducer, and at least one second side-firing transducer. An example of such a playback device is the playback device 702 illustrated in FIGS. 7A, 7B, 7C, and 7D. Other playback devices with different arrangements of audio transducers may be suitable as well.

Figure 8:
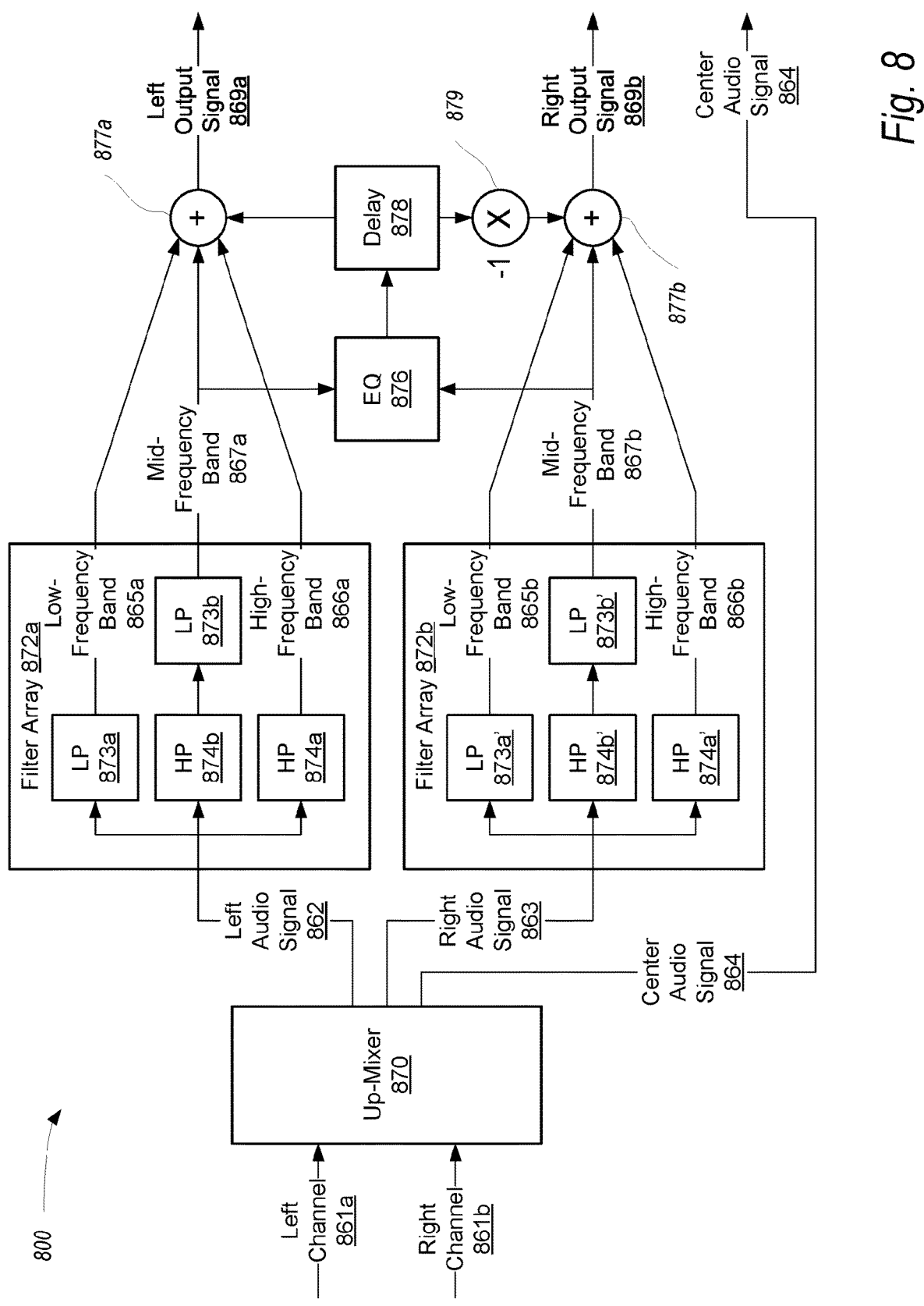
FIG. 8 is a functional block diagram illustrating example processing of stereo audio content in accordance with aspects of the disclosure.

In examples, such playback devices may reproduce stereo content partially directly and partially as a dipole. FIG. 8 is a functional block diagram showing an example implementation 800 that facilitates three-band processing of stereo audio content. The three bands include a low-frequency band 865 and a high-frequency band 866, which are reproduced directly, as well as a mid-frequency band 867 that is reproduced partially directly and partially as a dipole.

Figure 9A:
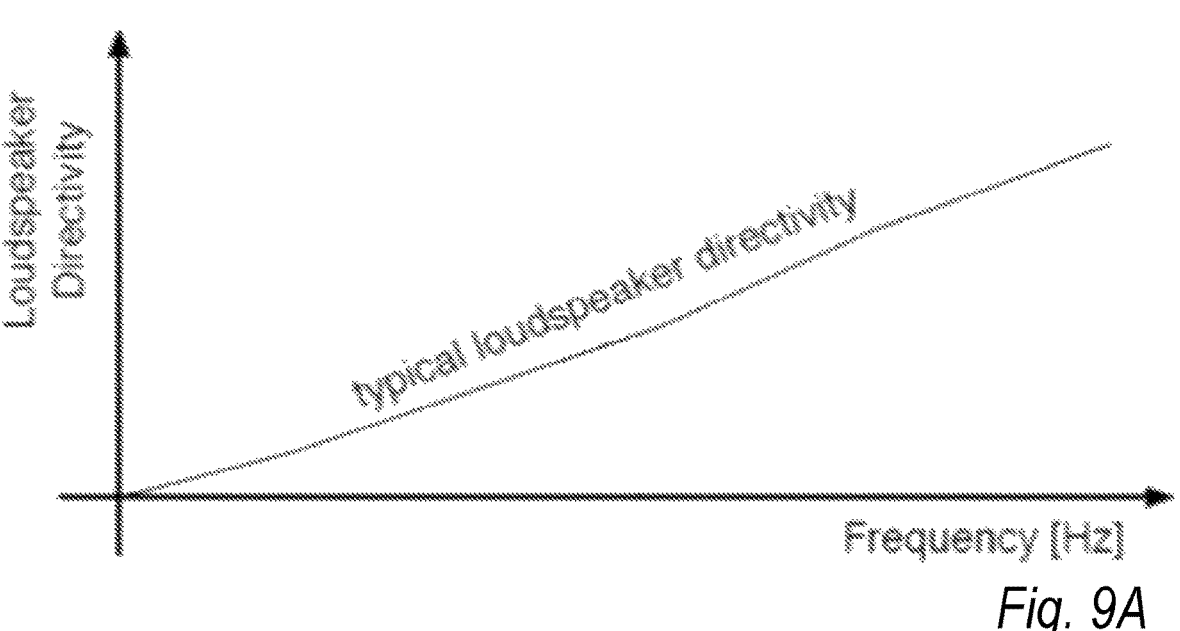
FIGS. 9A, 9B, 9C, 9D, 9E, and 9F are graphs illustrating performance of a dipole in accordance with aspects of the disclosure.
Figure 9B:
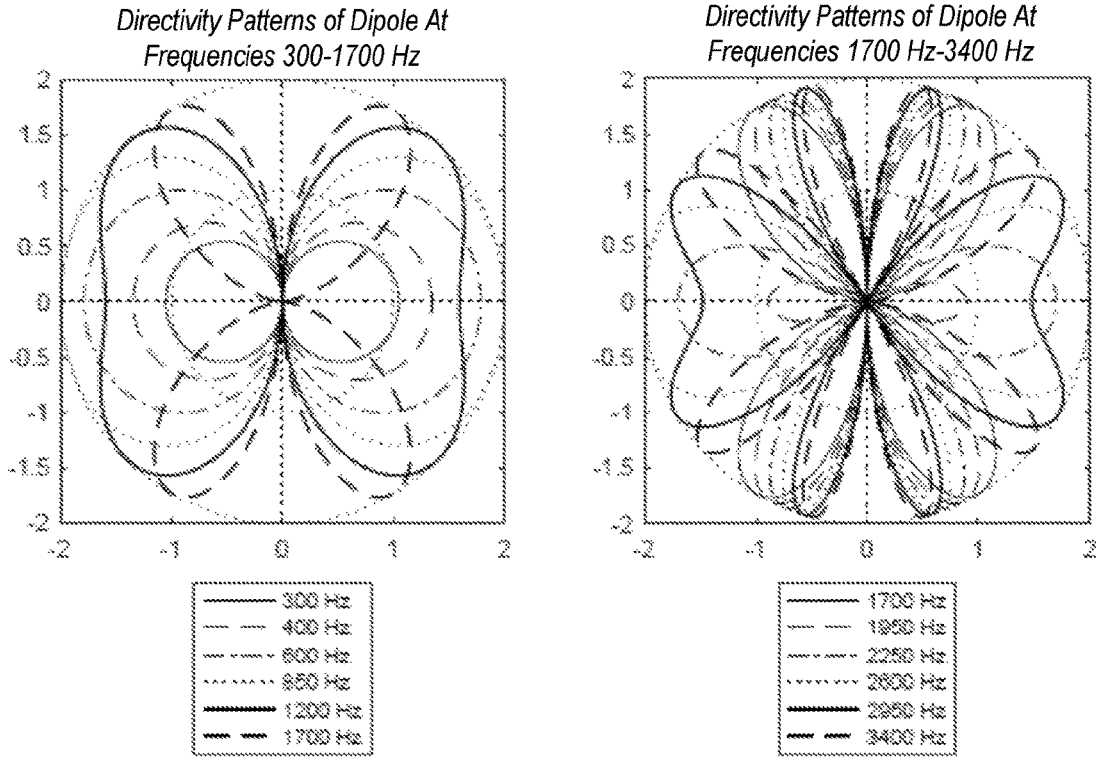

One benefit of such three-band processing is a wider stereo image at lower frequencies (e.g., in the mid-frequency band 867) As indicated above, by nature of their physical arrangement, side-firing transducers have good directivity at higher frequencies (e.g., within the high-frequency band 866), but poor directivity at lower frequencies, as illustrated by the graph shown in FIG. 9A. On the other hand, a dipole has good directivity at lower frequencies, as illustrated in the graphs shown in FIG. 9B, which show directivity patterns of a dipole at various frequencies.

Returning to FIG. 8, a left channel 861*a* and a right channel 861*b* of stereo audio content are provided as input to an up-mixer 870. The up-mixer 870 is configured to up-mix the left channel 861*a* and the right channel 861*b* to a left audio signal 862, a right audio signal 863, and a center audio signal 864. The up-mixer 870 may implement any suitable algorithm for up-mixing two channels to three channels. Suitable algorithms may include algorithms that perform multi-channel conversion, primary/ambient decomposition, or spatial decomposition, among other examples.

Example multi-channel conversion algorithms, including linear ("passive") and steered ("active") matrix techniques, derive additional loudspeaker signals in cases where there are more speakers than input channels. These algorithms are typically implemented in the time domain. Passive matrix methods are inexpensive to implement but may reduce the width of the front image. In steered matrix algorithms, the matrix coefficients are updated dynamically and are typically used to boost a dominant source (e.g., a loud sound in a movie soundtrack). Additional details of multi-channel conversion algorithms described in, for example, in Carlos Avendano and Jean-Marc Jot, "A Frequency-Domain Approach to Multichannel Upmix," J. Audio Eng. Soc., vol. 52, No. 7/8, 2004 July/August, which is incorporated herein by reference in its entirety.

Example primary/ambient composition algorithms up-mix stereo content to multichannel via extract or simulate the ambience of a recording, such that it can be played from the side channels and the primary content played from the center. Primary/ambient composition algorithms may operate in the time domain, but many recently-developed such algorithms operate in the frequency domain (e.g., the short time Fourier transform domain). Example short-time Fourier transform (STFT)-based algorithms extract the ambient and direct components of stereo content using least-squares estimation, Principal Components Analysis (PCA), as well as other techniques. Additional details of multi-channel conversion algorithms described in, for example, in Christof Faller, "Multiple-Loudspeaker Playback of Stereo Signals," J. Audio Eng. Soc., vol. 54, no. 11, pp. 1051-1064, 2006 November and U.S. Pat. No. 8,107,631, titled "Correlation-Based Method for Ambience Extraction From Two-Channel Audio Signals," which are incorporated herein by reference in their entirety.

Like example primary/ambient composition algorithms, example spatial decomposition algorithms may similarly operate in the STFT domain but not explicitly attempt primary/ambient decomposition. Instead, such techniques may attempt to extract a center channel. Additional details of multi-channel conversion algorithms described in, for example, in U.S. Pat. No. 8,705,769, titled "Two-To-Three Channel Upmix for Center Channel Derivation," which is incorporated by reference herein in its entirety.

Within examples, the up-mixer 870 may implement an algorithm that generates a center audio signal 864 that is not strongly correlated with the left audio signal 862 and the right audio signal 863. Example techniques that may generate such a center channel include the example multi-channel conversion, primary/ambient decomposition, or spatial decomposition, among other possible algorithms. Further, the up-mixing algorithm implemented by the up-mixer 870 may, as an effect of the up-mixing, reduce correlation between the left audio signal 862 and right audio signal 863 (relative to correlation between the left channel 861a and the right channel 861b).

After up-mixing, the left audio signal 862 is separated into three bands to facilitate three-band processing. As shown in FIG. 8, the left audio signal 862 is provided as input to a filter array 872a. The filter array 872a includes a low-pass filter (LP) 873a and a high-pass filter (HP) 874a to extract, respectively, a low-frequency band 865a and high frequency band 866a from the left audio signal 862, as shown. The filter array 872a further includes a high pass filter (HP) 874b and a low-pass filter (LP) 873b to extract a mid-frequency band 867a from the left audio signal 862.

Similarly, after up-mixing, the right audio signal 863 is similarly separated into three bands to facilitate three-band processing. As shown in FIG. 8, the right audio signal 863 is provided as input to a filter array 872b. The filter array 872b includes a low-pass filter (LP) 873a' and a high-pass filter (HP) 874a' to extract, respectively, a low-frequency band 865b and high frequency band 866b from the right audio signal 863, as shown. The filter array 872b further includes a high pass filter 874b' and a low-pass filter (LP) 873b' to extract a mid-frequency band 867b from the right audio signal 863.

In operation, the filter arrays 872 may facilitate a gradual transition from direct reproduction in the low-frequency band 865, to partial direct and partial dipole reproduction in the mid-frequency band 867, and to direct reproduction in the high-frequency band 866. The low-pass filters 873 and high-pass filters 874 may be implemented with any suitable filter. Example filters include Linkwitz-Riley infinite impulse response low-pass and high-pass filters.

In example implementations, the low-pass filters 873 and the high-pass filters 874 of the filter array 862 are configured to generate a mid-frequency band 867 with a particular lower bound. As indicated previously, the mid-frequency band 867 will ultimately be reproduced as a dipole. Although, a dipole has good directionality at low frequencies, in certain practical applications, too much gain may be required at low frequencies to achieve dipole operation. As such, the lower bound of the mid-frequency band 867 may be limited to a frequency that balances the benefit of dipole operation and the gain required for such operation. In certain example playback devices described herein, such as the playback device 702, this frequency may be approximately ~300 Hz, which may be used as the lower bound of the mid-frequency band 867 in this example.

Figure 9C:
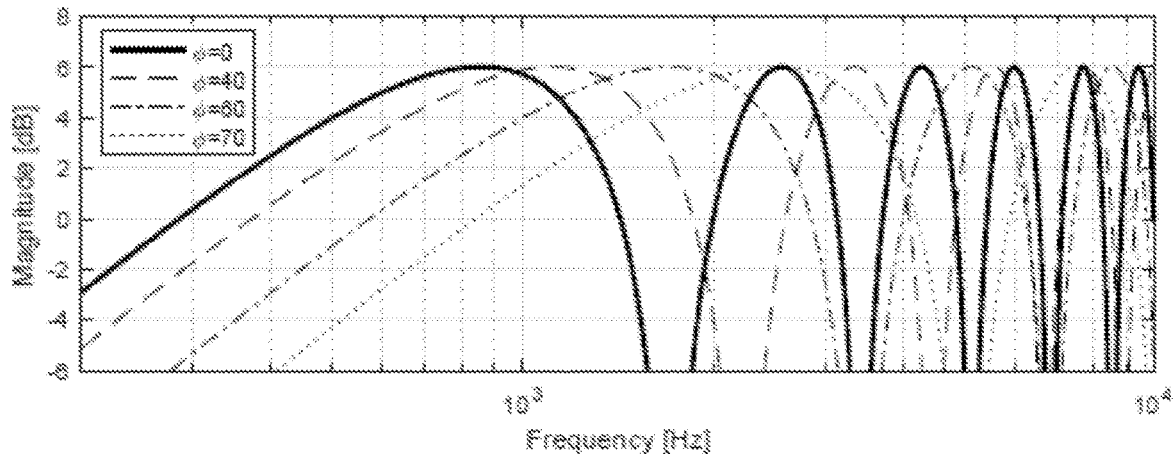

Similarly, the low-pass filters 873 and the high-pass filters 874 of the filter array 862 are configured to generate a mid-frequency band 867 with a particular upper bound. The upper bound of the mid-frequency band 867 may be set by the first null of the dipole's response, which may occur at different frequencies based on design characteristics (i.e., the distance between the side-firing transducers 718). FIG. 9C is a graph showing the frequency responses in different directions of a dipole formed by transducers spaced by 20 cm. As shown, the first null in the primary direction of output (φ=0) occurs around approximately ~1200 Hz. In this example, the upper bound of the mid-frequency band 867 may be configured with this value. These upper and lower bounds may be configured at different frequencies based on design characteristics of the playback device in which the three-band processing is being implemented.

Figure 9D:
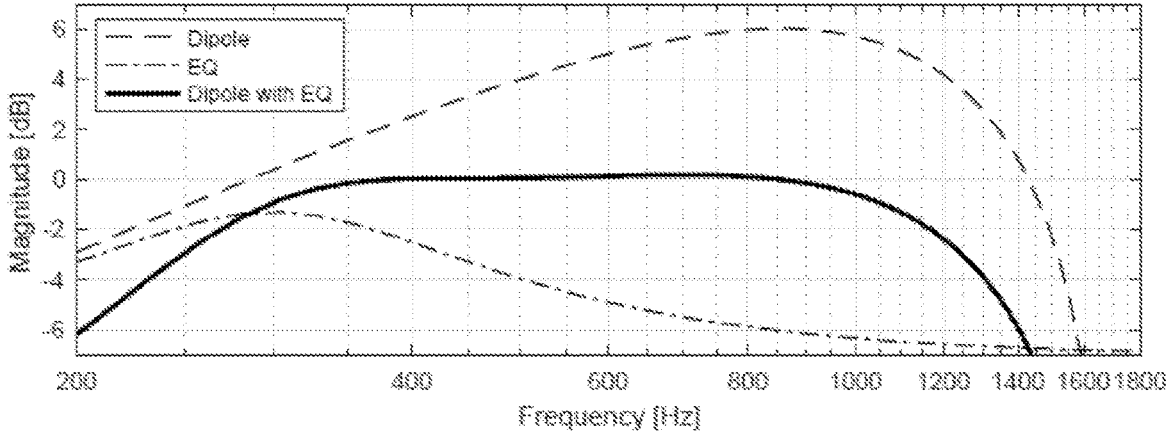
Figure 9E:
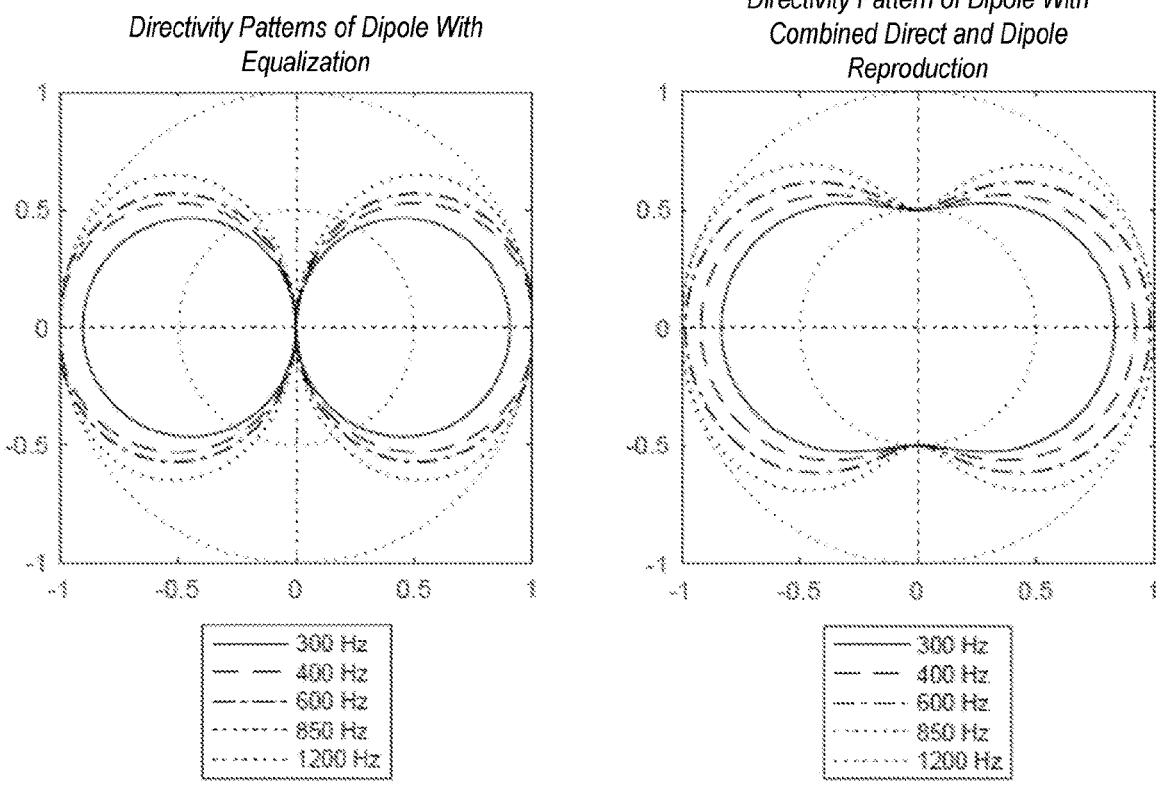

The mid-frequency bands 867 are further processed with an equalizer (EQ) 876. When applied to the mid-frequency bands 867, the EQ 876 flattens the response of the mid-frequency bands 867 across the frequency range of the mid-frequency band 867 (e.g., from 300-1200 Hz). FIG. 9D is a diagram showing an example dipole response, example equalization, and an example dipole response after equalization.

To generate the left output signal 869a, the low-frequency band 865a, the high-frequency band 866a, and the mid-frequency band 867a are combined with a mixer 877a. Mathematically, for the left channel 861a (l) of a signal s this can be represented as:

$$s_l(C) = ul(t) + (1 - u)e(l(t) - r(t)$$

where u is amplitude of the direct portion, (1−u) is the amplitude of the dipole portion, and e is the equalization. Similarly, to generate the right output signal 869b, the low-frequency band 865b, the high-frequency band 866b, and the mid-frequency band 867b are combined with a mixer 878b. Mathematically, for the right channel 861a (r) of a signal s, this can be represented as:

$$s_r(t) = ur(t) + (1 - u)e(r(t) - l(t)$$

In some implementations, a delay 877 is optionally added. This delay changes the phase of the dipole, which may reduce phase cancellation. Example delays may be from 5-10 milliseconds, among other examples. This delay results in some comb filtering, so some implementations may exclude the delay 877.

Further, to prevent cancelation of the dipoles when the left channel 861a (l) is the same as the right channel 861b (r), the dipole contributions may be reproduced with the same (e.g., left dipole). In this example, a multiplier 879 inverts the dipole. Then, in this example, for the left channel 861*b* (r) of the signal s, this can be represented mathematically as:

$$s_l(t) = ul(t) + (1 - u)e(l(t - \tau) + r(t - \tau)$$

Also, for the right channel 861*b* (r) of the signal s, this can be represented as:

$$s_r(t) = ur(t) + (1 - u)e(l(t - \tau) + r(t - \tau)$$

Figure 9F:
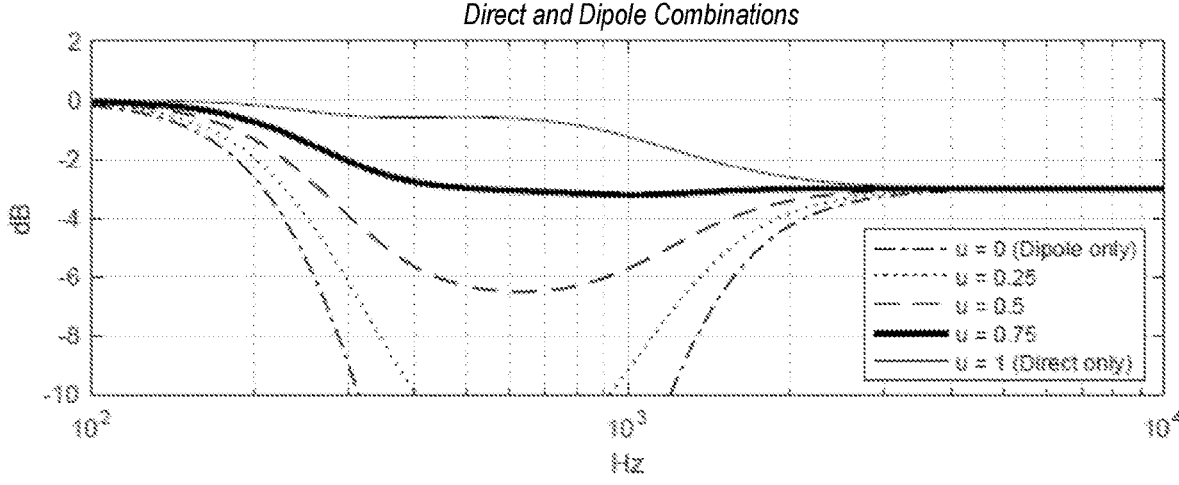

Different direct and dipole combinations will provide different performance. FIG. 9F is a graph that compares responses for different amplitudes of the direct portion u. As shown, a direction portion of u=0.75 may provide a flatter response relative to other values shown in FIG. 9F.

While one goal of the three-band processing is increasing the width of the stereo image at lower frequencies, maximum directionality is not always beneficial. For instance, when a listener is in front of the forward-firing transducer, moving the left and right output channels further away from center may reduce clarity as perceived by this listener. As such, example implementations might not seek to maximize the width of the stereo image, but rather balance the benefit of a wider stereo image with loss of clarity. For example, the playback device 702 may equalize the left output signal 869*a* and right output signal 869*b* relative to the center output signal 864 to balance output among the forward-firing and side-firing transducers.

In some implementations, the playback device 702 is configured to detect obstructions (e.g., objects, walls or other boundaries) in proximity to the playback device 702. Obstacles within a minimum threshold distance (e.g., 30 cm) to one or more of the side-firing transducers may cause distortion or other undesirable effects on playback. At the same time, a user might not realize that such an obstacle is impacting playback and may instead believe that their device is malfunctioning. When an obstruction are detected, the playback device 702 may take action to reduce or mitigate its effect.

In some cases, a playback device may be positioned with a wall or other obstruction within a minimum threshold distance (e.g., 30 cm) to one or more of the side-firing transducers. In such cases, maximum directionality from these side-firing transducer(s) might not be desirable, as the directing the transducer's output towards the obstruction may distort or otherwise interfere with the output. In such examples, the playback devices may self-correct their output to avoid at least some of the effects of the obstruction.

The playback device may detect obstructions using any suitable technique. For instance, the playback device 702 may include one or more microphones, which it may use to capture its own output. By analyzing this captured output for distortions, the playback device may detect the presence of an obstruction in proximity to (e.g., less than 30 cm from) the audio transducer. In further examples, the playback device may include one or more sensors (e.g., an IR LED infrared or ultrasonic sensor) to more directly detect the distance from the playback device to any obstruction(s) that are proximate to the playback device.

Figure 10A:
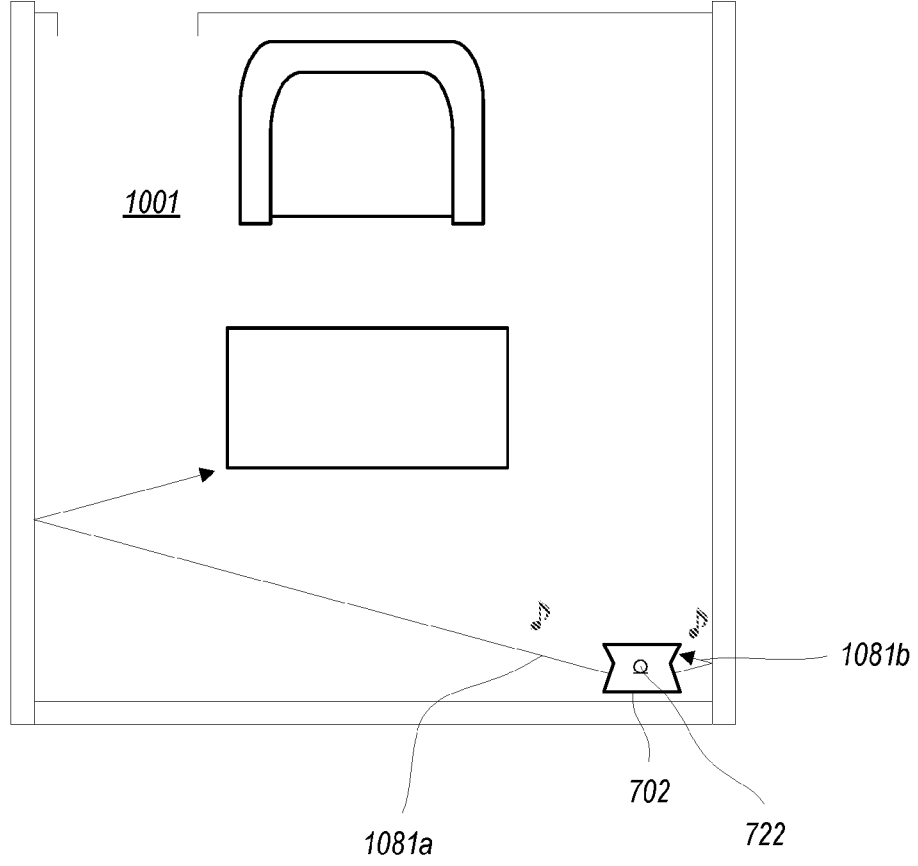
FIGS. 10A and 10B are diagrams illustrating example calibration techniques accordance with aspects of the disclosed technology.

FIG. 10A illustrates the playback device 702 in an example zone 1001. As shown, the playback device 702 is positioned in a corner of the room. The side-firing speaker(s) 718 on the left side (e.g., the side-firing transducer 718*b* and/or the side-firing transducer 718*c*) are directing their output into the room primarily (e.g., with a maximum response lobe) in a first direction indicated by a first arrow 1081*a*. The first direction is approximately 75° from the forward direction.

The side-firing speaker(s) 718 on the right side (e.g., the side-firing transducer 718*e* and/or the side-firing transducer 718*f*) are directing their output primarily in a second direction indicated by a second arrow 1081*b*. As shown, the side-firing speaker(s) 718 on the right side are directing their output into a proximate wall, which typically causes distortion. Like the first direction, the second direction is approximately 75° from the forward direction, albeit on the opposite side.

As further shown in FIG. 10A, the playback device 702 includes one or more microphones 722. In this example, the playback device 702 is configured to capture its own output via the speakers 718 using the microphone 722. After capturing the output, the playback device 702 analyzes the output to detect whether the output is representative of distorted output. Obstructions in close proximity to the playback device 702 may cause significant distortions that are identifiable in a frequency response (e.g., a power spectral density). Additional details of obstruction detection are described in, for example, in U.S. Pat. No. 9,264,839, titled "Playback Device Configuration Based on Proximity Detection," which is incorporated by reference herein in its entirety.

Within examples, when an obstruction is detected, the playback device 702 is configured to use a steering technique to direct the output away from its "natural" output pattern (e.g., as provided by the physical configuration of the speakers 718 and/or example spatial imaging techniques described herein) and in a direction that is less affected by the obstruction. For instance, the playback device 702 may narrow the stereo image and direct its output primarily more towards the forward direction.

Within examples, beam steering with the playback device 702 may involve varying the gain on the speakers 718. In particular, amplifying output on the forward-facing transducer 718*a* more relative to the side-firing transducers 718 will cause the directional impulse response to move toward the forward direction. Additional details of beam steering are described in, for example, in U.S. Pat. No. 9,973,851, titled "Multi-Channel Playback of Audio Content," which is incorporated by reference herein in its entirety.

Figure 10B:
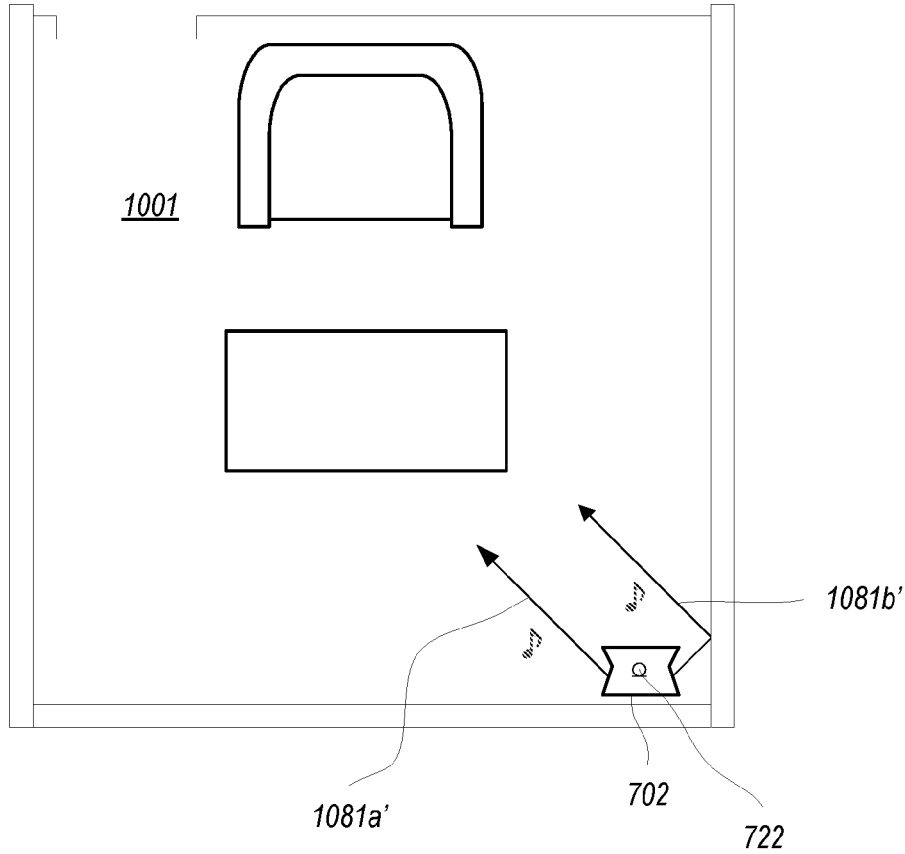

To illustrate, FIG. 10B illustrates the output of the playback device 702 after steering its output to avoid or lessen the effect of the proximate wall. As shown, the side-firing speaker(s) 718 on the left side (e.g., the side-firing transducer 718*b* and/or the side-firing transducer 718*c*) are now directing their output into the room primarily in a third direction indicated by a third arrow 1081*a*'. Similarly, the side-firing speaker(s) 718 on the right side (e.g., the side-firing transducer 718*e* and/or the side-firing transducer 718*f*) are directing their output primarily in a fourth direction indicated by a fourth arrow 1081*b*'. The third and fourth directions are approximately 45° from the forward direction on either side. As shown, the side-firing speaker(s) 718 on the right side are now directing their output into a proximate wall at an angle that permits sound to reflect back into the zone 1001 rather than being significantly distorted.

In further examples, the playback device 702 is configured to use the microphones 722 for one or more self-calibration procedures. The playback device 702 may perform such calibration procedures independently of or in conjunction with obstruction detection. Such self-calibration procedures may be triggered periodically or when a change in the playback device 702 (e.g., a change in position or orientation) or the environment is detected.

In such procedures, the playback device 702 captures its own playback using its own microphones and then determines a self-impulse response. The playback device may then identify a pre-determined spectral correction that is mapped to the determined self-impulse response. Such mapping may be based on a machine learning algorithm that has been trained on a large number of manual spectral calibration iterations in different listening areas. Additional details regarding self-calibration can be found, for example, in U.S. Pat. No. 9,763,018, titled "Calibration of Audio Playback Devices," U.S. Pat. No. 10,299,061, titled "Playback Device Calibration," and U.S. Pat. No. 10,734,965, titled "Audio Calibration of a Portable Playback Device," which are each incorporated by reference in their entirety.

V. Example Spatial Imaging Techniques

FIG. 11 is a flow diagram showing an example method 1100 to widen a spatial image of a playback device. The method 1100 may be performed by a playback device having multiple audio transducers in a suitable arrangement, such as the playback device 702 (FIG. 7A-7D). A suitable arrangement may include a forward-firing transducer, one or more first side-firing transducers, and one or more second side-firing transducers, among other possible examples. In further examples, the method is performed by two or more playback devices operating as a system. Alternatively, the method 1100 may be performed by any suitable device or by a system of devices, such as the NMDs 103, control devices 104, computing devices 105, and/or computing devices 106. For purposes of illustration, the method 1100 is described as being performed by the playback device 702.

At block 1102, the method 1100 includes receiving data representing stereo audio content. For instance, the playback device 702 may receive stereo audio content comprising a left channel and a right channel via an input interface, such as the network interface 224 (FIG. 2A). The playback device 702 may receive stereo audio content from any of the example audio content sources described in connection with section II. a., as well as other suitable sources of stereo audio content.

At block 1104, the method 1100 includes up-mixing the left channel and the right channel to generate a left audio signal, a right audio signal, and a center audio signal. For example, the play back device 702 may up-mix the left channel 861 a and the right channel 8651b via the up-mixer 870 to generate the left audio signal 862, the right audio signal 863, and the center audio signal 864, as described in connection with FIG. 8. Other examples are possible as well.

At block 1106, the method 1100 includes filtering the left audio signal and the right audio signal into respective frequency bands. For instance, the playback device 702 may apply the filter array 872a to the left audio signal 862 to generate the low-frequency band 865a, the high-frequency band 866a, and the mid-frequency band 867a, as described in connection with FIG. 8. Similarly, the playback device 702 may apply the filter array 872b to the right audio signal 863 to generate the low-frequency band 865b, the high-frequency band 866b, and the mid-frequency band 867b, also as described in connection with FIG. 8. Further examples are possible as well.

At block 1108, the method 1100 includes generating a dipole from the mid-frequency bands filtered from the left audio signal and the right audio signal. For example, the playback device 702 may generate a dipole from the mid-frequency bands 867 as discussed in connection with FIG. 8. Additional examples of generating a dipole are possible as well.

In some examples, the method 1100 involves may further involve applying an equalization to the mid-frequency bands. For instance, the playback device 702 may apply the EQ 876 (FIG. 8) to the mid-frequency bands 867. The equalization applied may be configured to equalization at least partially flatten out a response of the generated dipole over the mid-frequency bands.

At block 1010, the method 1000 includes combining the generated dipole with (a) the filtered left audio signal to generate a left output signal and (b) the filtered right audio signal to generate a right output signal. For instance, the playback device 702 may mix the low-frequency band 865a, the high-frequency band 866a, the mid-frequency band 867a, and the generated dipole to generate the left output signal 869a, as discussed in connection with FIG. 8. Similarly, the playback device 702 may mix the low-frequency band 865b, the high-frequency band 866b, the mid-frequency band 867b, and the generated dipole to generate the right output signal 869b, also as discussed in connection with FIG. 8. Further examples of combination to generate an output signals are possible as well.

At block 1012, the method 1000 includes outputting (i) the left output signal via the one or more first side-firing transducers, (ii) the right output signal via the one or more second side-firing transducers, and (iii) the center audio signal via the forward-firing transducer. For example, the playback device 702 may output the left output signal 869a via the side-firing transducer 718b and/or the side-firing transducer 718c (FIGS. 7A-7D). Likewise, the playback device 702 may output the left output signal 869a via the side-firing transducer 718e and/or the side-firing transducer 718f (FIGS. 7A-7D). Further, the playback device 702 may output the center audio signal via the forward-firing transducer 718a (FIGS. 7A-7D). Additional examples of outputting the output signals via suitable transducers are possible as well.

In some examples, the method 1100 may further involve inverting the generated dipole. For instance, the playback device 702 may invert a dipole generated from the mid-frequency bands of the left audio signal via the multiplier 879 (FIG. 8). The playback device 702 may then combine the filtered left audio signal with the dipole and the filtered right audio signal with the inverted dipole to generate the left output signal 869a and the right output signal 869b, respectively. Alternatively, the playback device 702 may invert a dipole generated from the mid-frequency bands of the right audio signal. In this case, the playback device 702 may then combine the filtered left audio signal with the inverted dipole and the filtered right audio signal with the dipole to generate the right output signal 869b and the left output signal 869a, respectively. Other examples are possible as well.

In further examples, the method 1100 may further include detecting an obstruction within a minimum proximity to the first side-firing audio transducer. For example, as discussed in connection with FIG. 10A, the playback device 702 may detect a wall within a minimum proximity to the playback device 702. The playback device 702 may detect obstructions using any suitable technique, such as the example techniques discussed in connection with FIG. 10A.

The method 1100 may then involve performing a self-correction, which may involve adjusting a mix between the first side-firing audio transducer and the forward-firing transducer to steer combined output of the first side-firing audio transducer and the forward-firing transducer away from the obstruction. For instance, as discussed in connection with FIG. 10B, the playback device 702 may steer its output toward the forward direction, which may reduce or eliminate distortion from the proximate wall. The playback device 702 may self-correct using any suitable technique, such as the example techniques discussed in connection with FIG. 10B.

VI. Example Mode Switching

Within examples, the playback device 702 (FIGS. 7A-7D) is configured to operate in one of multiple modes. The playback device 702 may switch between the multiple modes when different types of audio content are selected for playback. The different types of content may correspond to audio content with different numbers of channels (e.g., stereo vs. surround), and/or different content itself (e.g., music vs. television sound). Different types of content may be enhanced in different ways, such as using the example spatial imaging techniques disclosed herein with stereo audio content or using other processing techniques with other types of content.

In some implementations, the modes are mutually exclusive in that the playback device 702 operates in only one of the multiple modes at a time. In further examples, two or more modes may be active concurrently with the two active modes being a subset of multiple modes supported by the playback device 702. In yet further examples, an example mode may include two or more sound processing techniques, which may be individually utilized in other modes.

For example, the playback device may be configured to enter a first mode while rending stereo audio content. In the first mode, the playback device 702 may utilize example spatial imaging techniques (FIG. 11). Operation in the first mode with the example spatial imaging techniques active may produce a wider stereo image as compared with a "natural" response of the playback device 702.

Further, the playback device 702 may be configured to enter a second mode while rendering surround audio content. In the second mode, the playback device 702 may utilize example primary-ambient decomposition techniques (Appendix A). Operation in the second mode with the example primary-ambient decomposition techniques active may produce less direction ambient content while maintaining directionality of primary audio content in the mix.

The play back device 702 may be configured to switch modes based on various triggers. For instance, the playback device 702 may switch to the first mode when configured as an individual playback device or stereo pair (FIG. 3B) and switch to the second mode when configured as a surround in a home theatre configuration (FIGS. 3C-3D). In other examples, the playback device 702 may switch between modes when a different input is selected, such as an HDMI input (which may cause, for instance, a switch to the second mode). In further examples, the playback device 702 may switch between modes when different content is received (e.g., surround channels of multi-channel audio content) or stereo audio content. Further examples are possible as well.

CONCLUSION

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

Example 1: A method to be performed by playback device comprising audio transducers including a forward-firing transducer, one or more first side-firing transducers, and one or more second side-firing transducers, and the method comprising: receiving data representing stereo audio content, the stereo audio content comprising a left channel and a right channel; up-mixing the left channel and the right channel to generate a left audio signal, a right audio signal, and a center audio signal; filtering the left audio signal and the right audio signal into respective frequency bands, the respective frequency bands comprising mid-frequency bands; generating a dipole from the mid-frequency bands filtered from the left audio signal and the right audio signal; combining the generated dipole with (a) the filtered left audio signal to generate a left output signal and (b) the filtered right audio signal to generate a right output signal; and outputting (i) the left output signal via the one or more first side-firing transducers, (ii) the right output signal via the one or more second side-firing transducers, and (iii) the center audio signal via the forward-firing transducer.

Example 2: The method of Example 1, further comprising: detecting an obstruction within a minimum proximity to the first side-firing audio transducer; and adjusting a mix between the first side-firing audio transducer and the forward-firing transducer to steer combined output of the first side-firing audio transducer and the forward-firing transducer away from the obstruction;

Example 3: The method of any of Example 1-2, wherein the one or more first side-firing transducers comprise a first woofer, wherein the one or more second side-firing transducers comprise a second woofer, and wherein the housing carries the first woofer and the second woofer such that the first woofer is oriented in a first direction and the second woofer is oriented in a second direction that is opposite the first direction in a plane.

Example 4: The method of Examples 3, wherein the forward-firing transducer comprises a tweeter, and wherein the housing carries the tweeter such that the tweeter is oriented in a third direction that is orthogonal to the first direction and the second direction in the plane.

Example 5: The method of Example 4, wherein the one or more first side-firing transducers further comprise a first additional tweeter, wherein the one or more second side-firing transducers comprise a second additional tweeter.

Example 6: The method of any of Examples 1-5, further comprising: before combination of the generated dipole, applying an equalization that at least partially flattens out a response of the generated dipole over the mid-frequency bands.

Example 7: The method of any of Examples 1-6, further comprising: filtering a low-frequency band from the left audio signal and the right audio signal; and filtering a high-frequency band from the left audio signal and the right audio signal, wherein combining the generated dipole with (a) the filtered left audio signal to generate the left output signal and (b) the filtered right audio signal to generate the right output signal comprises combining the generated dipole with the filtered low-frequency band from the left audio signal, the filtered low-frequency band from the left audio signal, and the filtered mid-frequency band from the left audio signal to generate the left output signal; and combine the generated dipole with the filtered low-frequency band from the right audio signal, the filtered low-frequency band from the right audio signal, and the filtered mid-frequency band the right audio signal to generate the right output signal.

Example 8: The method of any of Examples 1-7, further comprising: inverting combine the generated dipole with either (a) the filtered left audio signal to generate the left output signal or (b) the filtered right audio signal to generate the right output signal; and the generated dipole, wherein combining the generated dipole with (a) the filtered left audio signal to generate the left output signal and (b) the filtered right audio signal to generate the right output signal comprise combining the generated dipole with either (a) the filtered left audio signal to generate the left output signal or (b) the filtered right audio signal to generate the right output signal; and combining the inverted dipole with the other of either (a) the filtered left audio signal to generate the left output signal or (b) the filtered right audio signal to generate the right output signal.

Example 9: The method of any of Examples 1-8: wherein the mid-frequency band corresponds to a particular range of frequencies comprising first-order directivity patterns produced by a configuration of the housing and the audio transducers in frequencies above bass frequencies.

Example 10: The method of Examples 1-10, wherein the particular range of frequencies extends from approximately 300 Hz to approximately 1200 Hz.

Example 11: A tangible, non-transitory, computer-readable medium having instructions stored thereon that are executable by one or more processors to cause a playback device to perform the method of any one of Examples 1-10.

Example 12: A media playback system comprising a playback device, the media playback system configured to perform the method of any one of Examples 1-10.

Example 13: A playback device comprising at least one speaker, a network interface, a microphone, one or more processors, and a data storage having instructions stored thereon that are executable by the one or more processors to cause the playback device to perform the method of any of Examples 1-10.

I claim:

1. A playback device comprising:
   audio transducers comprising a forward-firing transducer, one or more first side-firing transducers, and one or more second side-firing transducers;
   a network interface;
   at least one processor; and
   a housing carrying the audio transducers, network interface, the at least one processor, and data storage including instructions that are executable by the at least one processor such that the playback device is configured to:
   receive data representing stereo audio content, the stereo audio content comprising a left channel and a right channel;
   up-mix the left channel and the right channel to generate a left audio signal, a right audio signal, and a center audio signal;
   filter the left audio signal and the right audio signal into respective frequency bands, the respective frequency bands comprising mid-frequency bands;
   generate a dipole from the mid-frequency bands filtered from the left audio signal and the right audio signal;
   combine the generated dipole with (a) the filtered left audio signal to generate a left output signal and (b) the filtered right audio signal to generate a right output signal; and
   output (i) the left output signal via the one or more first side-firing transducers, (ii) the right output signal via the one or more second side-firing transducers, and (iii) the center audio signal via the forward-firing transducer,
   wherein the playback device further comprises instructions that are executable by the at least one processor such that the playback device is configured to:
   detect an obstruction within a minimum proximity to the first side-firing audio transducer; and
   adjust a mix between the first side-firing audio transducer and the forward-firing transducer to steer combined output of the first side-firing audio transducer and the forward-firing transducer away from the obstruction.

2. The playback device of claim 1, wherein the one or more first side-firing transducers comprise a first woofer, wherein the one or more second side-firing transducers comprise a second woofer, and wherein the housing carries the first woofer and the second woofer such that the first woofer is oriented in a first direction and the second woofer is oriented in a second direction that is opposite the first direction in a plane.

3. The playback device of claim 2, wherein the forward-firing transducer comprises a tweeter, and wherein the housing carries the tweeter such that the tweeter is oriented in a third direction that is orthogonal to the first direction and the second direction in the plane.

4. The playback device of claim 3, wherein the one or more first side-firing transducers further comprise a first additional tweeter, and wherein the one or more second side-firing transducers comprise a second additional tweeter.

5. The playback device of claim 1, further comprising instructions that are executable by the at least one processor such that the playback device is configured to:

before combination of the generated dipole, apply an equalization that at least partially flattens out a response of the generated dipole over the mid-frequency bands.

6. The playback device of claim 1, further comprising instructions that are executable by the at least one processor such that the playback device is configured to:

filter a low-frequency band from the left audio signal and the right audio signal; and filter a high-frequency band from the left audio signal and the right audio signal, wherein the instructions that are executable by the at least one processor such that the playback device is configured to combine the generated dipole with (a) the filtered left audio signal to generate the left output signal and (b) the filtered right audio signal to generate the right output signal comprise instructions that are executable by the at least one processor such that the playback device is configured to:

combine the generated dipole with the filtered low-frequency band from the left audio signal, the filtered low-frequency band from the left audio signal, and the filtered mid-frequency band from the left audio signal to generate the left output signal; and combine the generated dipole with the filtered low-frequency band from the right audio signal, the filtered low-frequency band from the right audio signal, and the filtered mid-frequency band the right audio signal to generate the right output signal.

7. The playback device of claim 1, further comprising instructions that are executable by the at least one processor such that the playback device is configured to:

invert the generated dipole, wherein the instructions that are executable by the at least one processor such that the playback device is configured to combine the generated dipole with (a) the filtered left audio signal to generate the left output signal and (b) the filtered right audio signal to generate the right output signal comprise instructions that are executable by the at least one processor such that the playback device is configured to:

combine the generated dipole with either (a) the filtered left audio signal to generate the left output signal or (b) the filtered right audio signal to generate the right output signal; and combine the inverted dipole with the other of either (a) the filtered left audio signal to generate the left output signal or (b) the filtered right audio signal to generate the right output signal.

8. The playback device of claim 1, wherein the mid-frequency band corresponds to a particular range of frequencies comprising first-order directivity patterns produced by a configuration of the housing and the audio transducers in frequencies above bass frequencies.

9. The playback device of claim 8, wherein the particular range of frequencies extends from approximately 300 Hz to approximately 1200 Hz.

10. A media playback system comprising a playback device that includes audio transducers comprising a forward-firing transducer, one or more first side-firing transducers, and one or more second side-firing transducers, the media playback system comprising:

a network interface;

at least one processor; and data storage including instructions that are executable by the at least one processor such that the media playback system is configured to:

receive data representing stereo audio content, the stereo audio content comprising a left channel and a right channel;

up-mix the left channel and the right channel to generate a left audio signal, a right audio signal, and a center audio signal;

filter the left audio signal and the right audio signal into respective frequency bands, the respective frequency bands comprising mid-frequency bands;

generate a dipole from the mid-frequency bands filtered from the left audio signal and the right audio signal;

combine the generated dipole with (a) the filtered left audio signal to generate a left output signal and (b) the filtered right audio signal to generate a right output signal;

output (i) the left output signal via the one or more first side-firing transducers, (ii) the right output signal via the one or more second side-firing transducers, and (iii) the center audio signal via the forward-firing transducer, wherein the playback device further comprises instructions that are executable by the at least one processor such that the playback device is configured to:

detect an obstruction within a minimum proximity to the first side-firing audio transducer; and adjust a mix between the first side-firing audio transducer and the forward-firing transducer to steer combined output of the first side-firing audio transducer and the forward-firing transducer away from the obstruction.

11. The media playback system of claim 10, further comprising instructions that are executable by the at least one processor such that the media playback system is configured to:

before combination of the generated dipole, apply an equalization that at least partially flattens out a response of the generated dipole over the mid-frequency bands.

12. The media playback system of claim 10, further comprising instructions that are executable by the at least one processor such that the media playback system is configured to:

filter a low-frequency band from the left audio signal and the right audio signal; and filter a high-frequency band from the left audio signal and the right audio signal, wherein the instructions that are executable by the at least one processor such that the media playback system is configured to combine the generated dipole with (a) the filtered left audio signal to generate the left output signal and (b) the filtered right audio signal to generate the right output signal comprise instructions that are executable by the at least one processor such that the media playback system is configured to:

combine the generated dipole with the filtered low-frequency band from the left audio signal, the filtered low-frequency band from the left audio signal, and the filtered mid-frequency band from the left audio signal to generate the left output signal; and combine the generated dipole with the filtered low-frequency band from the right audio signal, the filtered low-frequency band from the right audio signal, and the filtered mid-frequency band the right audio signal to generate the right output signal.

13. The media playback system of claim 10, further comprising instructions that are executable by the at least one processor such that the media playback system is configured to:

invert the generated dipole, wherein the instructions that are executable by the at least one processor such that the playback device is configured to combine the generated dipole with (a) the filtered left audio signal to generate the left output signal and (b) the filtered right audio signal to generate the right output signal comprise instructions that are executable by the at least one processor such that the playback device is configured to:

combine the generated dipole with either (a) the filtered left audio signal to generate the left output signal or (b) the filtered right audio signal to generate the right output signal; and combine the inverted dipole with the other of either (a) the filtered left audio signal to generate the left output signal or (b) the filtered right audio signal to generate the right output signal.

14. The media playback system of claim 10, wherein the one or more first side-firing transducers comprise a first woofer, wherein the one or more second side-firing transducers comprise a second woofer, and wherein a housing of the playback device carries the first woofer and the second woofer such that the first woofer is oriented in a first direction and the second woofer is oriented in a second direction that is opposite the first direction in a plane.

15. The media playback system of claim 14, wherein the forward-firing transducer comprises a tweeter, and wherein the housing carries the tweeter such that the tweeter is oriented in a third direction that is orthogonal to the first direction and the second direction in the plane.

16. The media playback system of claim 15, wherein the one or more first side-firing transducers further comprise a first additional tweeter, and wherein the one or more second side-firing transducers comprise a second additional tweeter.

17. A method to be performed by a playback device comprising audio transducers including a forward-firing transducer, one or more first side-firing transducers, and one or more second side-firing transducers, the method comprising:

receiving data representing stereo audio content, the stereo audio content comprising a left channel and a right channel;

up-mixing the left channel and the right channel to generate a left audio signal, a right audio signal, and a center audio signal;

filtering the left audio signal and the right audio signal into respective frequency bands, the respective frequency bands comprising mid-frequency bands;

generating a dipole from the mid-frequency bands filtered from the left audio signal and the right audio signal;

combining the generated dipole with (a) the filtered left audio signal to generate a left output signal and (b) the filtered right audio signal to generate a right output signal;

outputting (i) the left output signal via the one or more first side-firing transducers, (ii) the right output signal via the one or more second side-firing transducers, and (iii) the center audio signal via the forward-firing transducer;

detecting an obstruction within a minimum proximity to the first side-firing audio transducer; and adjusting a mix between the first side-firing audio transducer and the forward-firing transducer to steer combined output of the first side-firing audio transducer and the forward-firing transducer away from the obstruction.

18. The method of claim 17, further comprising:

before combination of the generated dipole, applying an equalization that at least partially flattens out a response of the generated dipole over the mid-frequency bands.

19. The method of claim 17, further comprising:

filtering a low-frequency band from the left audio signal and the right audio signal; and filtering a high-frequency band from the left audio signal and the right audio signal, wherein combining the generated dipole with (a) the filtered left audio signal to generate the left output signal and (b) the filtered right audio signal to generate the right output signal comprises:

combining the generated dipole with the filtered low-frequency band from the left audio signal, the filtered low-frequency band from the left audio signal, and the filtered mid-frequency band from the left audio signal to generate the left output signal; and combining the generated dipole with the filtered low-frequency band from the right audio signal, the filtered low-frequency band from the right audio signal, and the filtered mid-frequency band the right audio signal to generate the right output signal.

20. The method of claim 17, further comprising:

inverting the generated dipole, wherein combining the generated dipole with (a) the filtered left audio signal to generate the left output signal and (b) the filtered right audio signal to generate the right output signal comprises:

combining the generated dipole with either (a) the filtered left audio signal to generate the left output signal or (b) the filtered right audio signal to generate the right output signal; and combining the inverted dipole with the other of either (a) the filtered left audio signal to generate the left output signal or (b) the filtered right audio signal to generate the right output signal.

* * * * *